(12) United States Patent
Mandadi et al.

(10) Patent No.: US 12,174,854 B2
(45) Date of Patent: Dec. 24, 2024

(54) VERSIONED HIERARCHICAL DATA STRUCTURES IN A DISTRIBUTED DATA STORE

(71) Applicant: Amazon Technologies, Inc., Seattle, WA (US)

(72) Inventors: Srikanth Mandadi, Redmond, WA (US); Matthew Berry, Seattle, WA (US); Slavka Praus, Seattle, WA (US); Chris Baker, Seattle, WA (US); Marvin Michael Theimer, Seattle, WA (US); Anders Samuelsson, Redmond, WA (US); Khaled Salah Sedky, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 7 days.

(21) Appl. No.: 17/508,831

(22) Filed: Oct. 22, 2021

(65) Prior Publication Data

US 2022/0043830 A1 Feb. 10, 2022

Related U.S. Application Data

(63) Continuation of application No. 15/132,098, filed on Apr. 18, 2016, now Pat. No. 11,157,517.

(51) Int. Cl.
*G06F 16/27* (2019.01)
*G06F 16/18* (2019.01)
(Continued)

(52) U.S. Cl.
CPC ........ *G06F 16/273* (2019.01); *G06F 16/1873* (2019.01); *G06F 16/2365* (2019.01); *G06F 16/282* (2019.01); *G06F 16/9024* (2019.01)

(58) Field of Classification Search
CPC .... G06F 16/273; G06F 16/27; G06F 16/1873; G06F 16/282; G06F 16/2365; G06F 16/9024
See application file for complete search history.

(56) References Cited

U.S. PATENT DOCUMENTS 6,192,365 B1 2/2001 Draper et al.
6,425,016 B1 7/2002 Banavar et al.
(Continued)

FOREIGN PATENT DOCUMENTS

CN 102831156 12/2012
CN 102855271 1/2013
(Continued)

OTHER PUBLICATIONS

U.S. Appl. No. 15/475,031, filed Mar. 30, 2017, Alazel Acheson, et al.
(Continued)

*Primary Examiner* — Vaishali Shah
(74) *Attorney, Agent, or Firm* — S. Scott Foster; Kowert, Hood, Munyon, Rankin & Goetzel, P.C.

(57) ABSTRACT

A distributed data store may maintain versioned hierarchical data structures. Different versions of a hierarchical data structure may be maintained consistent with a transaction log for the hierarchical data structure. When access requests directed to the hierarchical data structure are received, a version of the hierarchical data structure may be identified for processing an access request. For access requests with snapshot isolation, the identified version alone may be sufficient to consistently process the access request. For access requests with higher isolation requirements, such as serializable isolation, transactions based on the access request may be submitted to the transaction log so that access requests resulting in committed transactions may be
(Continued)

allowed, whereas access requests resulting in conflicting transactions may be denied.

20 Claims, 15 Drawing Sheets

(51) Int. Cl.
  *G06F 16/23* (2019.01)
  *G06F 16/28* (2019.01)
  *G06F 16/901* (2019.01)

(56) References Cited

U.S. PATENT DOCUMENTS

| | | |
|---|---|---|
| 6,968,364 B1 | 11/2005 | Wong et al. |
| 7,424,671 B2 | 9/2008 | Elza et al. |
| 7,483,923 B2 | 1/2009 | Novik |
| 7,549,028 B2 | 6/2009 | Thompson et al. |
| 7,603,393 B1 | 10/2009 | Cote et al. |
| 7,617,262 B2 | 11/2009 | Prahlad et al. |
| 7,689,602 B1 | 3/2010 | Sim-Tang |
| 7,734,578 B2 | 6/2010 | Prahlad et al. |
| 7,822,711 B1 | 10/2010 | Ranade |
| 7,853,667 B1* | 12/2010 | Yoder .................. G06F 3/0649 709/217 |
| 8,024,294 B2 | 9/2011 | Kottomtharayil |
| 8,060,619 B1 | 11/2011 | Saulpaugh et al. |
| 8,489,656 B2 | 7/2013 | Erofeev |
| 8,751,460 B1* | 6/2014 | Annapragada .... G06F 16/90335 707/684 |
| 8,849,955 B2 | 9/2014 | Prahlad et al. |
| 8,880,474 B2 | 11/2014 | Mason et al. |
| 8,886,601 B1 | 11/2014 | Landau et al. |
| 9,053,124 B1 | 6/2015 | Dornquast et al. |
| 9,135,268 B2 | 9/2015 | Dash |
| 9,268,651 B1* | 2/2016 | Salyers .................. G06F 12/08 |
| 9,632,828 B1* | 4/2017 | Mehta .................. G06F 9/5011 |
| 10,095,428 B1 | 10/2018 | Meiri |
| 10,671,639 B1 | 6/2020 | Acheson et al. |
| 10,706,166 B1 | 7/2020 | Mandadi et al. |
| 11,157,517 B2 | 10/2021 | Mandadi et al. |
| 11,308,123 B2 | 4/2022 | Acheson et al. |
| 11,386,078 B2* | 7/2022 | Schreter .................. G06F 16/27 |
| 2002/0040385 A1* | 4/2002 | Segawa .................. G06F 9/466 709/224 |
| 2003/0009511 A1* | 1/2003 | Giotta .................... G06F 9/465 709/201 |
| 2003/0014432 A1 | 1/2003 | Teloh |
| 2004/0240458 A1* | 12/2004 | T V .................... H04L 67/1001 370/351 |
| 2004/0243709 A1* | 12/2004 | Kalyanavarathan ........................ H04L 67/1001 709/226 |
| 2005/0086384 A1 | 4/2005 | Ernst |
| 2005/0182800 A1* | 8/2005 | Ashwin .................. G06F 16/252 707/999.203 |
| 2005/0198377 A1* | 9/2005 | Ferguson ............ H04L 65/1101 709/238 |
| 2006/0010130 A1* | 1/2006 | Leff ........................ G06F 9/466 |
| 2007/0150341 A1 | 6/2007 | Zia et al. |
| 2007/0226730 A1 | 9/2007 | Coyle et al. |
| 2008/0077762 A1* | 3/2008 | Scott .................. G06F 16/1724 711/170 |
| 2009/0006489 A1 | 1/2009 | Ramasubramanian et al. |
| 2010/0030752 A1 | 2/2010 | Goldentouch |
| 2010/0174692 A1 | 7/2010 | Meyer et al. |
| 2010/0211554 A1* | 8/2010 | Reid .................. G06F 16/2358 707/703 |
| 2011/0153566 A1 | 6/2011 | Larson et al. |
| 2012/0101991 A1 | 4/2012 | Srivas et al. |
| 2012/0167098 A1* | 6/2012 | Lee .................... G06F 16/2379 718/101 |
| 2012/0233251 A1 | 9/2012 | Holt |
| 2012/0254111 A1 | 10/2012 | Carmichael |
| 2013/0036227 A1* | 2/2013 | Stevens, III ........ H04L 65/1073 709/226 |
| 2014/0279929 A1* | 9/2014 | Gupta .................. G06F 16/2365 707/683 |
| 2014/0280360 A1 | 9/2014 | Webber et al. |
| 2015/0112934 A1 | 4/2015 | Quakkelaar et al. |
| 2015/0134637 A1 | 5/2015 | Pall et al. |
| 2015/0293820 A1 | 10/2015 | Doshi et al. |
| 2015/0356019 A1 | 12/2015 | Johar et al. |
| 2015/0363468 A1 | 12/2015 | Alvey et al. |
| 2016/0092463 A1 | 3/2016 | Vijayan |
| 2016/0147458 A1* | 5/2016 | Shayesteh ............. G06F 3/0619 711/162 |
| 2016/0196324 A1 | 7/2016 | Haviv |
| 2017/0075909 A1 | 3/2017 | Goodson |
| 2017/0193042 A1* | 7/2017 | Yung .................. G06F 16/2453 |
| 2022/0245171 A1 | 8/2022 | Acheson et al. |

FOREIGN PATENT DOCUMENTS

| | | |
|---|---|---|
| CN | 103164219 | 6/2013 |
| CN | 104216955 | 12/2014 |
| CN | 104281506 | 5/2015 |
| CN | 104636084 | 5/2015 |
| CN | 105122241 | 12/2015 |
| JP | 2008538632 | 10/2008 |
| JP | 2013543601 A | 12/2013 |
| JP | 2015232879 | 12/2015 |
| JP | 2016511486 | 4/2016 |
| JP | 2016511489 | 4/2016 |
| KR | 10-2015-0122226 | 10/2015 |
| WO | 2006115589 | 11/2006 |
| WO | 2013035295 A1 | 3/2013 |
| WO | 2014150538 | 9/2014 |
| WO | 2015200686 | 12/2015 |

OTHER PUBLICATIONS

U.S. Appl. No. 15/475,024, filed Mar. 30, 2017, Mahendra Manshi Chheda, et al.

U.S. Appl. No. 15/475,034, filed Mar. 30, 2017, Mahendra Manshi Chheda, et al.

International Search Report and Written Opinion from PCT/US2017/028125, Dated Aug. 7, 2017, Amazon Technologies, Inc., pp. 1-13.

Kiran-Kumar Munsiwamy-Reddy, et al., "A Versatile and User-Oriented Versioning File System", USENIX, Mar. 30, 2004, pp. 1-15.

Office Action from Korean Application No. 10-2018-7032841, dated Sep. 30, 2019, (Korean Version and English Translation), pp. 1-11.

Office Action from Japanese Application No. 2018-554725, dated Oct. 8, 2019, (Japanese Version and English Translation), pp. 1-14.

Office Action mailed Mar. 30, 2021 in Japanese Patent Application No. 2020-031312, Amazon Technologies, Inc., pp. 1-11.

Office Action mailed Apr. 30, 2021 in Chinese Patent Application No. 201780024249.8, Amazon Technologies, Inc., pp. 1-34.

Extended European Search Report mailed Aug. 23, 2021 in European Patent Application No. 21173881.0, Amazon Technologies, Inc., pp. 1-10.

Anonymous, "Wikipedia: Serializability," Feb. 28, 2016, Retrieved from the Internet: URL:https://en.wikipedia.org/w/index.php?title=Serializability&oldid=707292573 [retrieved on Aug. 11, 2021], the whole document.

Anonymous, "DBMS States of Transaction—javapoint," Oct. 1, 2021, Retrieved from the Internet: URL:https://web.archive.org/web/20201001122205/https://www.javatpoint.com/dbms-states-of-transaction [retrieved on Aug. 11, 2021], the whole document.

"Azure AD: Under the hood of our geo-redundant, highly available, distributed cloud directory," Alex Simons, Sep. 2, 2014, available at https://blogs.technet.microsoft.com/ad/2014/09/02/azure-ad-under-the-hood-of-our-geo-redundant-highly-available-distributed-cloud-directory/#, pp. 1-9.

Office Action mailed Jan. 11, 2022 in Japanese Patent Application No. 2020-031312, Amazon Technologies, Inc., pp. 1-4 including translation.

(56) References Cited

OTHER PUBLICATIONS

Office Action mailed Jun. 2, 2023 in European Divisional Patent Application No. 21173881.0, Amazon Technologies, Inc., pp. 1-8.
Rachael Harding et al: "An Evaluation of Distributed Concurrency Control", Proceedings of the VLDB Endowment, Jan. 1, 2017, pp. 553-564, vol. 10, No. 5, ACM Digital Library, New York, NY.
Summons mailed Jun. 21, 2024 in European Patent application No. 21173881.0, Amazon Technologies, Inc., pp. 1-14.
Loesing, Simon, et al., "On the Design and Scalability of Distributed Shared-Data Databases", Proceedings of the 27th Annual International Conference on Mobile Computing and Networking, May 27, 2015, pp. 663-676, ACM, New York, NY, USA.

* cited by examiner current version table 450

| Subject | Predicate | Object | Latest Version | Previous Version |
|---|---|---|---|---|
| GUID_401 | link.child.aa | GUID_402 | Ver_1 | Null |
| GUID_401 | link.child.bb | GUID_403 | Ver_4 | Ver_2 |
| GUID_403 | link.parent.GUID_401.bb | GUID_401 | Ver_4 | Ver_2 |
| GUID_402 | link.parent.GUID_401.aa | GUID_401 | Ver_1 | Null |
| GUID_406 | attr.PolicyType | AuthPolicy | Ver_6 | Null |
| GUID_406 | attr.PolicyDoc | description data | Ver_10 | Ver_9 |
| GUID_406 | link.PolicyFor.GUID_402 | GUID_* | Ver_7 | Null |
| GUID_402 | link.HasPolicy.AuthPolicy | GUID_406 | Ver_7 | Null |
| GUID_404 | attr.UserDefined.FriendlyName | Node4 | Ver_12 | Null |
| GUID_407 | link.IndexFor.GUID_401 | GUID_* | Ver_1 | Null |

FIG. 4B prior version table 460

| Subject | Predicate | Object | Previous Version |
|---|---|---|---|
| GUID_401 | link.child.z_Ver_2 | GUID_403 | Null |
| GUID_403 | link.child.z_Ver_2 | GUID_401 | Null |
| GUID_406 | link.PolicyDoc_Ver_9 | description data | Ver_6 |
| GUID_406 | link.PolicyDoc_Ver_6 | description data | Null |

FIG. 4C

VERSIONED HIERARCHICAL DATA STRUCTURES IN A DISTRIBUTED DATA STORE

BACKGROUND

This application is a continuation of U.S. patent application Ser. No. 15/132,098, filed Apr. 18, 2016, which is hereby incorporated by reference herein its entirety.

Hierarchical storage systems have implemented many different storage schemes for efficiently and reliability persisting data. Storage schemes implemented on distributed system architecture are often deployed when storage system client applications require greater availability of the data persisted in the data storage system. Common solutions to making data available including storing one or more versions or replicas of data on multiple storage nodes. However, by increasing the number of versions or replicas, the complexity and operational costs for generating consistent views of hierarchical data increases. For example, synchronization protocols may require that a single component be allowed to handle operations such as writes or other modifications to the hierarchical data. Such a synchronization protocol would reduce the availability of the distributed system to respond to client requests, as the single component may become overburdened. Thus, consistency mechanisms that provide consistent versions of hierarchical data without sacrificing availability are highly desirable.

BRIEF DESCRIPTION OF THE DRAWINGS

FIGS. 4B and 4C are example tables illustrating the stored format of a data model for a hierarchical data structure, according to some embodiments.

Figure 1:
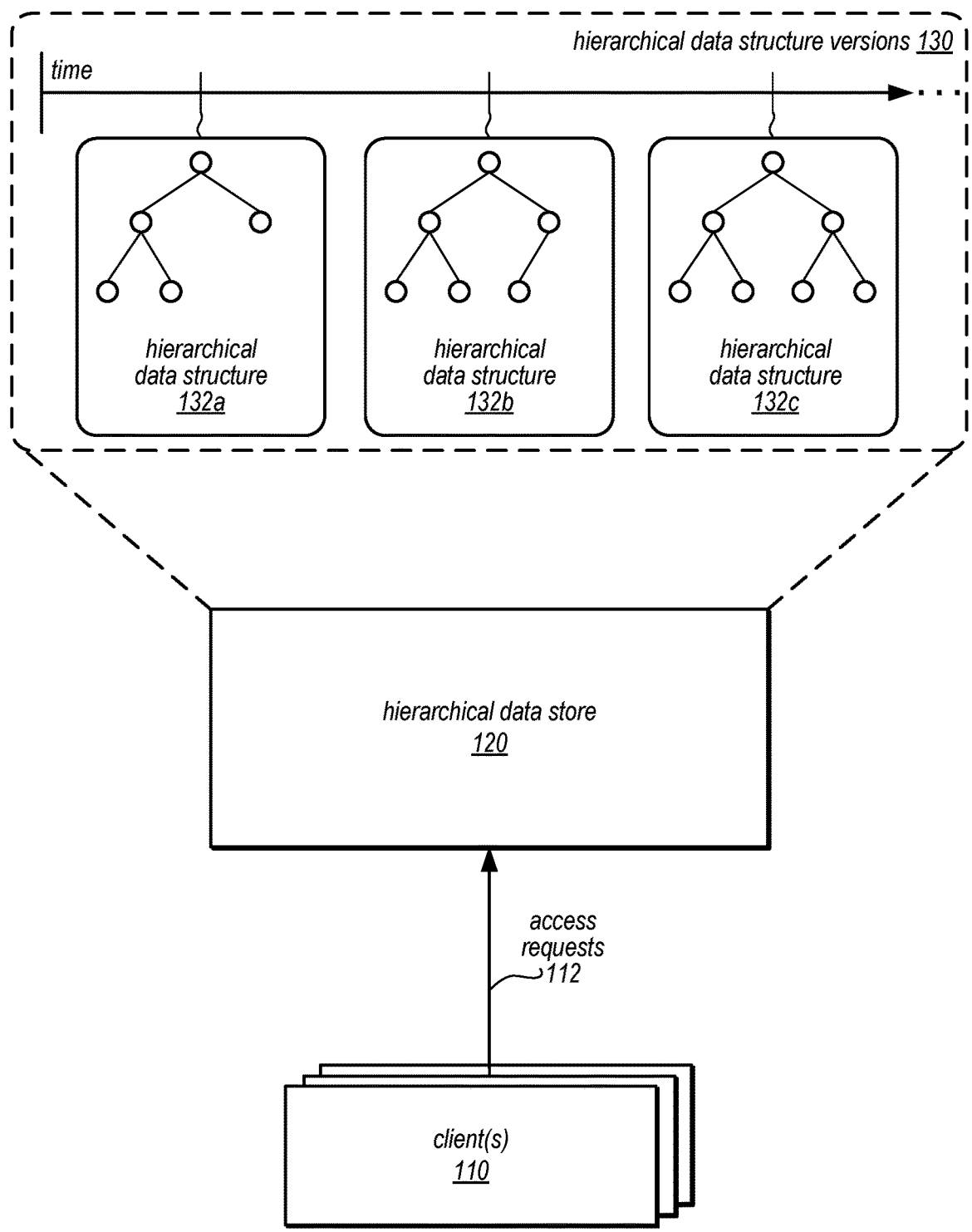
FIG. 1 is a logical block diagram illustrating a hierarchical data store that provides versioned hierarchical data structures, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of versioned hierarchical data structures in a distributed data store are described herein. Typically a hierarchical data store, such as directory data store, limits access to a consistent and current version of a hierarchical data structure (e.g., tree, graph, or other hierarchy-based data structure). This allows for the hierarchical data store to provide consistency in the face of concurrent access requests. Such implementations force all access requests to be performed utilizing similar processing paths, providing similar consistency and isolation levels, which offers little flexibility to clients who may not always desire consistency or isolation at the cost of speed or other performance considerations when accessing a hierarchical data structure. Providing versioned hierarchical data structures allows for multiple types of consistency models to be implemented so that different requests can specify a desired isolation and/or consistency level and thus control the performance of the request with respect to accessing the hierarchical data structure.

FIG. 1 is a logical block diagram illustrating a hierarchical data store that provides versioned hierarchical data structures, according to some embodiments. Hierarchical data store 120 may offer multiple versions of the hierarchical data structure 132 over time so that various kinds of consistency and isolation levels may be implemented when servicing access requests 112. For example, each version, such as versions 132a, 132b, and 132c of a hierarchical data structure may be maintained so that historical queries (or queries that do not care if there is a chance of stale data) can utilize the version of the hierarchical data structure that is quickly available (e.g., at a storage node maintaining the hierarchical data structure in memory). Other access requests 112 that desire or require a strongly consistent version of the hierarchical data structure can invoke operations that provide serializable isolation for the access request, such as by evaluating the request with respect to a transaction log utilizing optimistic concurrency as discussed below. Access requests 112 may also invoke path-based traversals to determine various information stored as part of hierarchical data structure 132.

Please note, FIG. 1 is provided as a logical illustration of a hierarchical data store providing versioned hierarchical data structures, and is not intended to be limiting as to the physical arrangement, size, or number of components, modules, or devices, implementing a distributed data store.

The specification first describes an example of a distributed data store as a directory storage service, according to various embodiments. The example directory storage service may store hierarchical data structures for many different clients, in various embodiments. Included in the description of the example network-based database service are various aspects of the example network-based directory storage service along with the various interactions between the directory storage service and clients. The specification then describes a flowchart of various embodiments of methods for versioned hierarchical data structures in a distributed data store. Next, the specification describes an example system that may implement the disclosed techniques. Various examples are provided throughout the specification.

Figure 2:
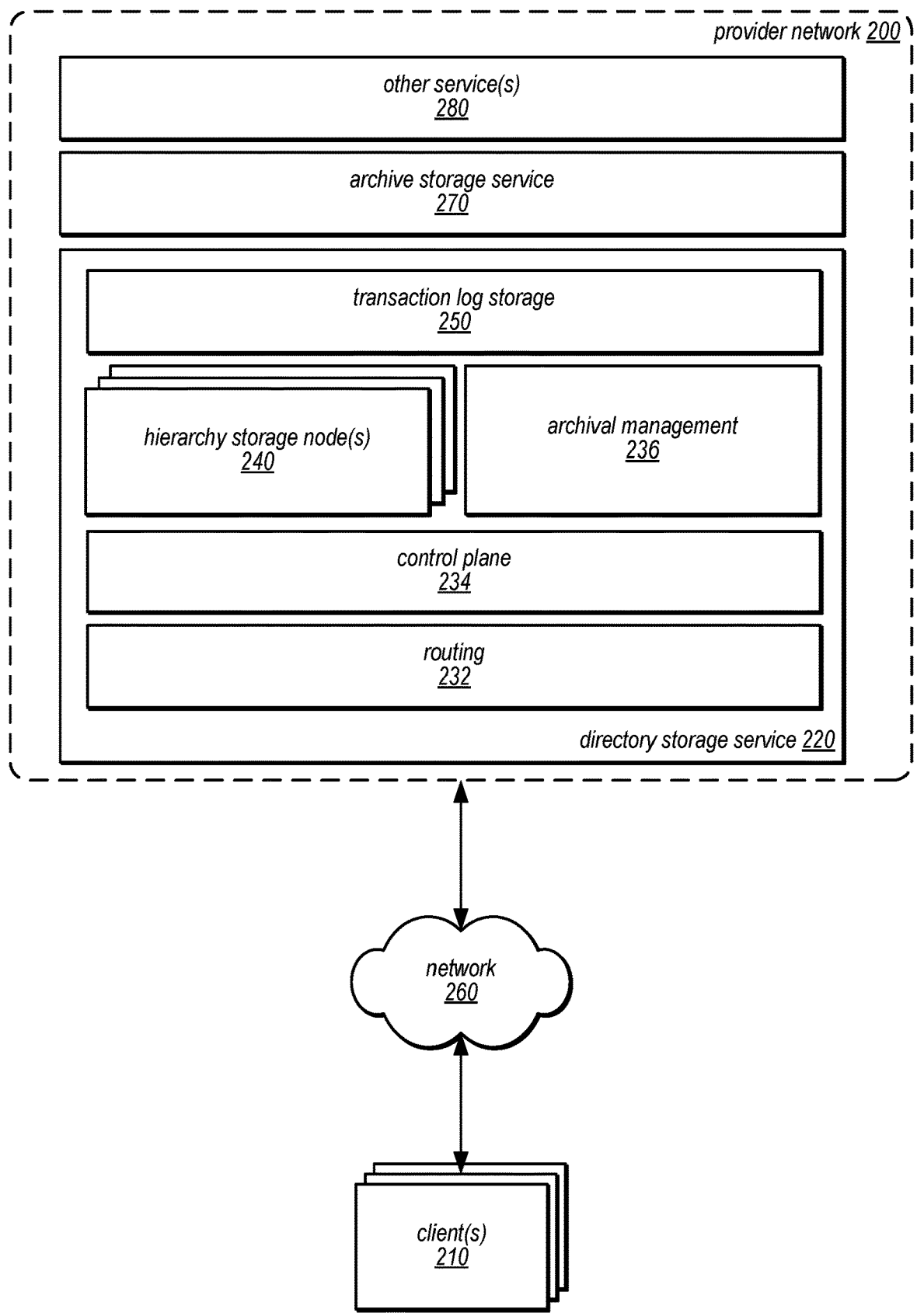
FIG. 2 is a block diagram illustrating a provider network that implements a directory storage service including a hierarchical data store that provides versioned hierarchical data structures, according to some embodiments.

FIG. 2 is a block diagram illustrating a provider network that implements a directory storage service that implements a hierarchical data store that provides versioned hierarchical data structures, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 2000 described below with regard to FIG. 14), needed to implement and distribute the infrastructure and services offered by the provider network 200. In some embodiments, provider network 200 may implement a directory storage service 220, described, provide other computing resources or services, such as a virtual compute service and storage services, such as object storage services, block-based storage services, data warehouse storage service, archive storage service 270 and/or any other type of network based services 280 (which may include various other types of storage, processing, analysis, communication, event handling, visualization, and security services). Clients 210 may access these various services offered by provider network 200 via network 260. Likewise network-based services may themselves communicate and/or make use of one another to provide different services. For example, various ones of other service(s) 280 may store, access, and/or rely upon hierarchical data structures stored in directory storage service 220.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 14 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Figure 4A:
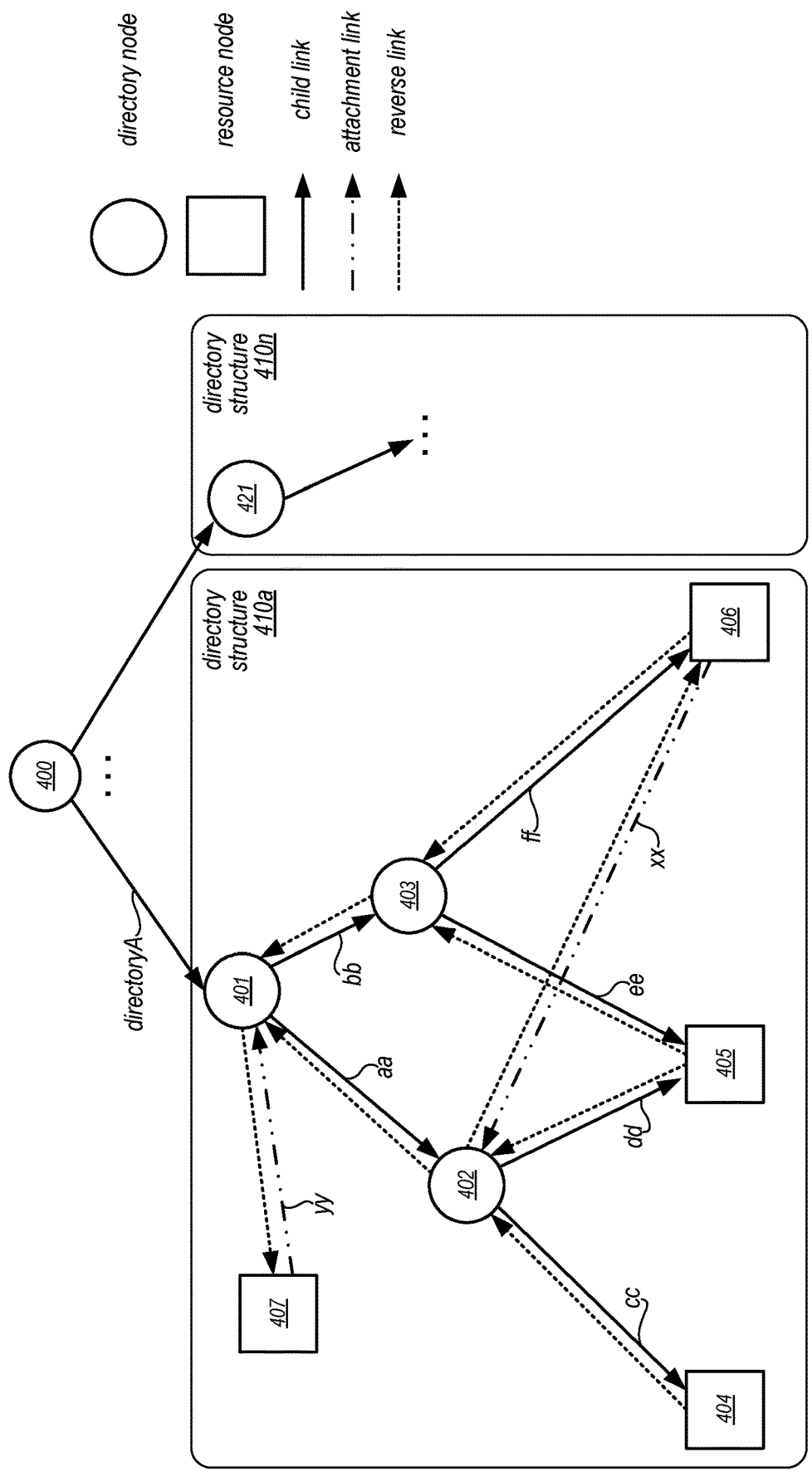
FIG. 4A is a block diagram illustrating a data model for a hierarchal data store that provides versioned hierarchical data structures, according to some embodiments.

Directory storage service 220 may store, manage, and maintain hierarchical data structures, such as a directory structure discussed below with regard to FIG. 4A, stored at various ones of hierarchy storage node(s) 240 (in single tenant or multi-tenant fashion). Clients of directory storage service 220 may operate on any subset or portion of the hierarchical data structure with transactional semantics and/ or may perform path-based traversals of hierarchical data structures. Such features allow clients to access hierarchical data structures in many ways. For instance, clients may utilize transactional access requests to perform multiple operations concurrently, affecting different portions (e.g., nodes) of the hierarchical directory structure (e.g., reading parts of the hierarchical directory structure, adding a node, and indexing some of the node's attributes, while imposing the requirement that the resulting updates of the operations within the transaction are isolated, consistent, atomic and durably stored).

Figure 5:
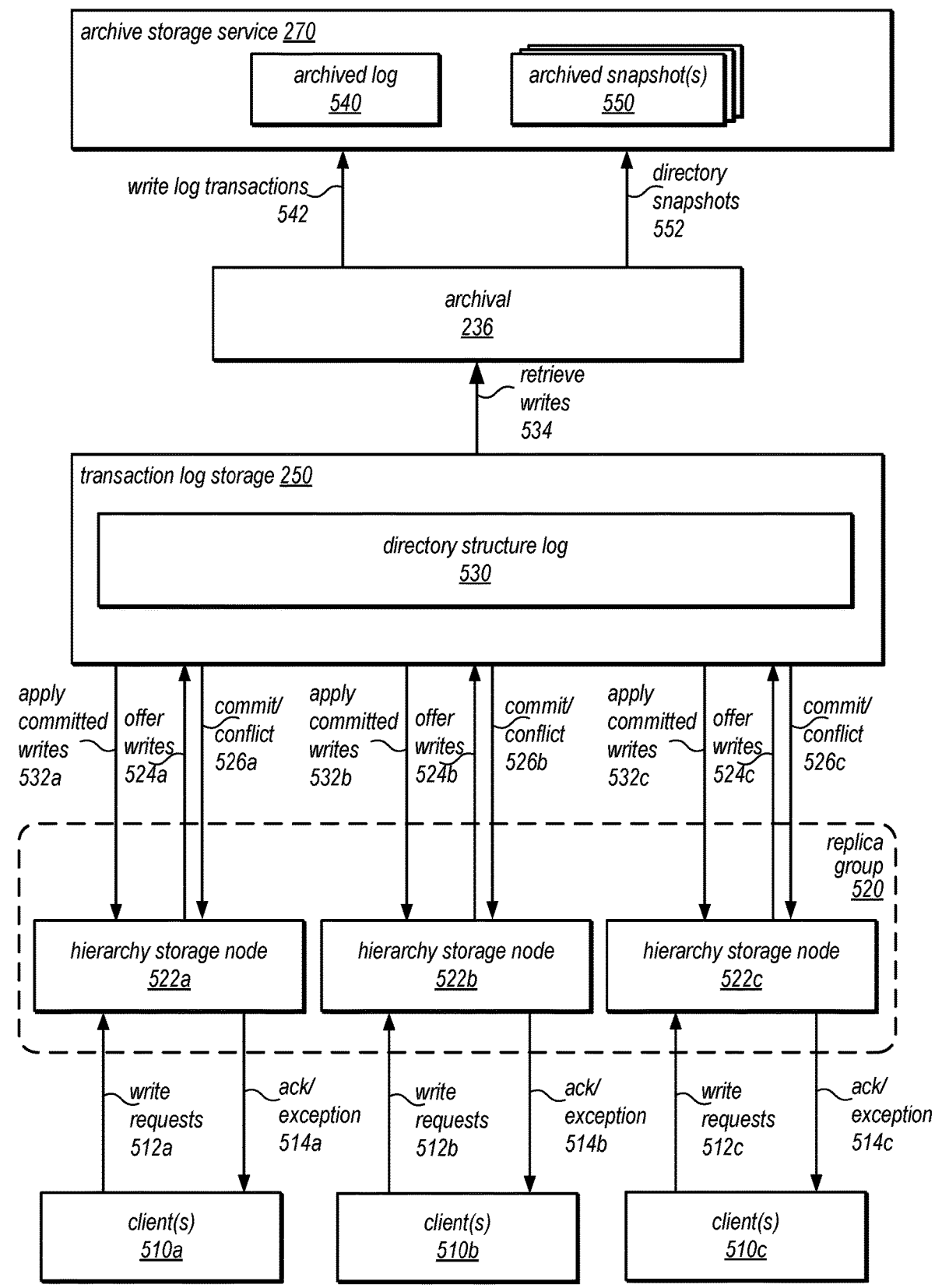
FIG. 5 is a block diagram illustrating the use of a separate transaction log store to provide consistent storage for versioned hierarchical data structures, according to some embodiments.

In various embodiments, directory storage service 220 may implement routing layer 232 to direct access requests from internal or external clients to the appropriate hierarchical storage node(s) 240. For example, routing layer 232 may implement a fleet of routing nodes that maintain mapping information which identifies the locations of a hierarchical data structures on hierarchy storage host(s) 240. When an access request is received, routing layer nodes may then determine which one of the hierarchy storage node(s) that hosts the hierarchical data structure identified in the access request to send the access request. Consider a scenario where hierarchical data structures may be replicated across multiple different hierarchy storage nodes 240 as part of a replica group, such as illustrated in FIG. 5 discussed below. Routing 232 may implement various load balancing schemes to direct requests from different clients to different hierarchy storage nodes within the replica group, so that no single hierarchy storage node becomes overburdened. Moreover, as hierarchy storage nodes 240 may utilize tokens to maintain state across different access requests sent by clients so that different hierarchy storage node(s) 240 may handle each request from the client, routing 232 need not track which hierarchy storage node is communicating with which client (as sticky sessions may be obviated by token state management techniques discussed below with regard to FIGS. 10 and 11).

Control plane 234 may implement various control functions to manage the hierarchy storage node(s) 240 and other components of directory storage service 220 that provide storage of hierarchical data structures, such as directing creation and placement of new hierarchical data structures on hierarchy storage node(s) 240, storage scaling, heat management, node repair and/or replacement. For example, various placement schemes may utilize techniques such as consistent hashing (e.g., based on hashing an identifier for individual hierarchical data structures) to identify hierarchy storage node(s) to store versions of the hierarchical data structure, or randomly mapping hierarchical data structures to a number hierarchy storage node(s) 240 that form a replica set. To provide heat management, for example, control plane 234 may collect hierarchy storage host(s) 240 metrics published by each host. Each host may have various thresholds for performance characteristics, such as memory utilization, CPU utilization, disk utilization, and request-rate capacity. When a hierarchy storage node reports metrics that exceed a threshold (or multiple thresholds), control plane 234 may direct the migration of one or more hierarchical data structures to different hierarchy storage nodes. Similarly, control plane 234 may detect when certain hierarchy storage nodes are unable to keep up with access requests directed to a particular replica group for a hierarchical data structure and may provision additional hierarchy storage node(s) to horizontally scale the replica group to better meet the access request demand.

Figure 3:
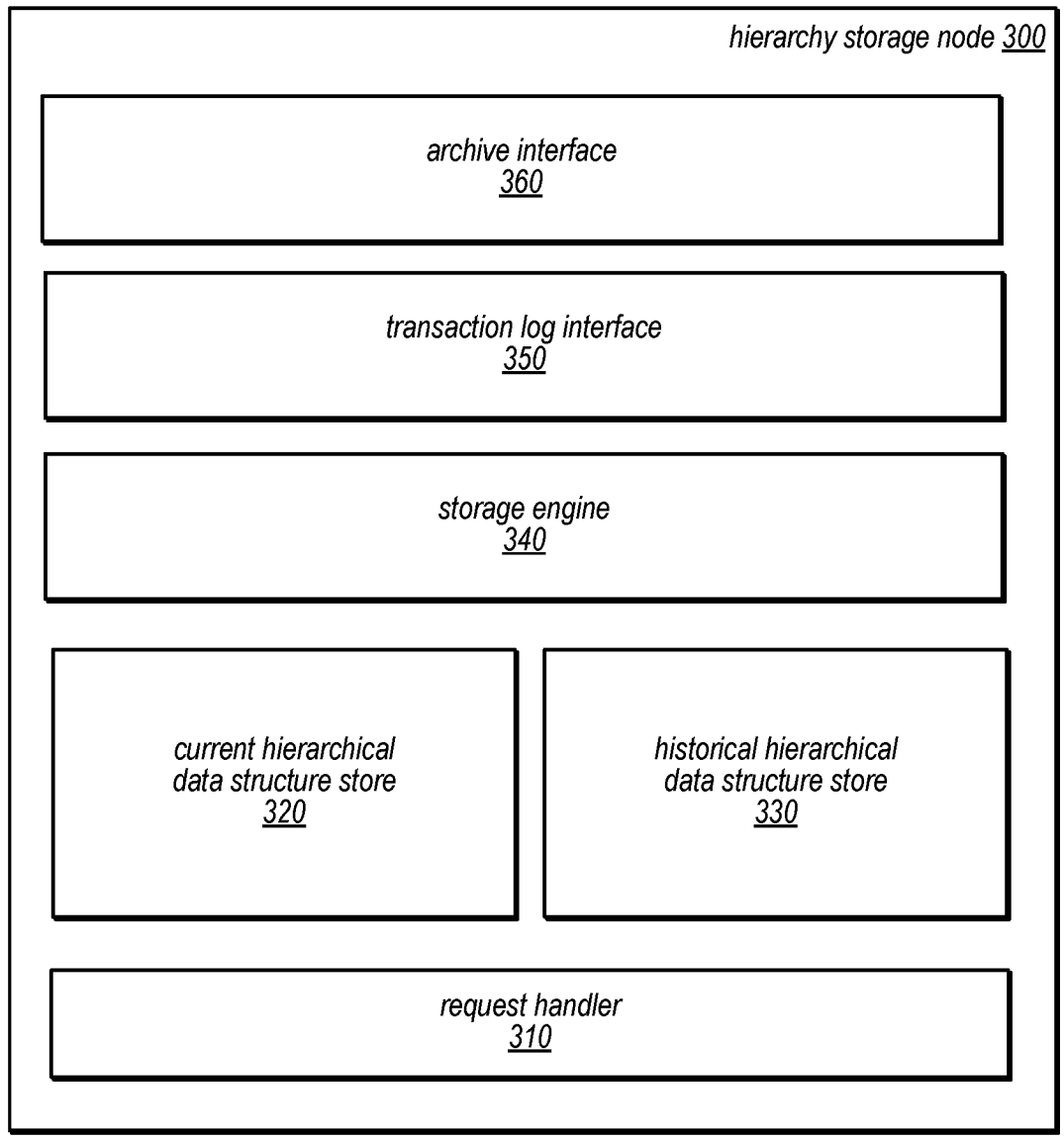
FIG. 3 is a block diagram illustrating a hierarchy storage node, according to some embodiments.

Hierarchy storage node(s) 240 may maintain and handle access to hierarchical storage nodes in directory storage service 220. FIG. 3 is a block diagram illustrating a hierarchy storage node, according to some embodiments. Hierarchy storage node 300 may implement request handler 310 to process access requests and pass along appropriate instructions or requests to other components, such as storage engine 340, transaction log interface 350 or archive interface 360. For example, access request handler 310 may interpret various requests formatted according to a programmatic interface, such as an application programming interface (API) like interface 600 discussed below with regard to FIGS. 6 through 11. Access requests may include various ones of the requests described in the aforementioned figures as well as other types of requests (which may include or embed the requests or operations described in FIGS. 6-11 below), such as various access requests to create, update, attach, detach, delete and query nodes in a hierarchical data structure, and access requests to define, populate, discover, and query a local index (which may be strongly consistent and maintained as part of or separately from the hierarchical data structure) on hierarchical data structure node attributes.

In various embodiments, storage engine 340 may be a storage engine configured to interact with structure or format of data as it is stored in current hierarchical data structure store 320 and historical hierarchical data structure store 330 (e.g., a key-value storage engine for data maintained in key-value storage format, relational data storage engine for data maintained in a relational storage format, etc.), which may be maintained according to the models discussed below with regard to FIG. 4A. In some embodiments, current hierarchical data structure store 320 may be partially or completely implemented in memory or other quick access storage devices, such as random access memory devices (RAM), as well as utilizing persistent block-based storage devices to store historical hierarchical data structure 330, including magnetic disk or solid state drives. In some embodiments, caching techniques may be implemented so that frequently accessed portions of data, such as frequently access portions of current hierarchical data structures are maintained in memory components whereas other portions are maintained in block-based persistent storage components. Hierarchy storage node 300 may operate multi-tenant storage for hierarchical data structures so that different hierarchical data structures maintained on behalf of different clients, accounts, customers, and the like may be maintained in current hierarchical data structure store 320 and historical hierarchical data structure store 330. For example, hierarchy storage node 300 may participate in different replica groups with different hierarchy storage nodes for the different hierarchical data structures stored at hierarchy storage node 300.

Transaction log interface 350 may provide capabilities to interact with (e.g., validate transactions) with respect to the logs corresponding to hierarchical data structures stored in transaction log storage 250 for the hierarchical data structures, according to the various techniques discussed below with regard to FIGS. 5-11. Similarly, archive interface 360 may be implemented to retrieve archived transactions or snapshots to service an access request for historical changes to the hierarchical data structure, a historical query, or other access requests that require a version of the hierarchical data structure that is older than that maintained in historical hierarchical data structure store.

Turning back to FIG. 2, transaction log storage 250 may provide a fault tolerant, high performance, durable, log publishing service. Transaction log storage 250 may be used as a commit log underlying strongly consistent distributed applications such as databases, key-value stores, and lock managers, and as illustrated in FIG. 2 directory storage service 220 providing hierarchical data storage. Transaction log storage 250 may provide strong consistency guarantees and support constraints between committed records, to enable features like deduplication, sequencing, and read-write conflict detection. For example, in the various requests illustrated in FIGS. 5, 6, 8, 9, and 11 below, transaction log storage 250 may determine whether or not to commit changes to hierarchical data structures (e.g., write requests and other modifications) by examining a proposed transaction for conflicts with other committed transactions. Such a feature may provide a fine-grained locking model over the hierarchical data structure (e.g., only those portions of the hierarchical data structure affected by a conflict between transactions may be locked). Transaction log storage may maintain a separate log or chain of log records for each hierarchical data structure, serving as an authoritative definition of the changes to the state hierarchical data structure over time. Transactions may be ordered according to transaction sequence numbers, which may be monotonically increasing to reference the state of a hierarchical data structure at individual points in time. Note that in some embodiments, transaction log storage 250 may be a separate network-based storage service implemented as part of provider network 250 external to directory storage service 220.

Archival management 236 may utilize transactions stored for different hierarchical data structures stored in respective transaction logs in transaction log storage 250 to generate and store snapshots of the hierarchical data structure at different points in time in archive storage service 270. For example, archival management may determine when snapshots of a hierarchical data structure should be captured, provision appropriate storage locations in archive storage service 270, and direct archive worker nodes (not illustrated) to perform the read, write, and other operations to generate and place the snapshots in archive storage service 270. Similarly, archival management 236 may direct the copying and storage of individual log records/transactions and/or groups of log records and transactions to be stored as part of an archived transaction log for hierarchical data structures in archive storage service 270.

Generally speaking, clients 210 may encompass any type of client configurable to submit network-based services requests to provider network 200 via network 260, including requests for directory services (e.g., a request to create or modify a hierarchical data structure to be stored in directory storage service 220, etc.). For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of persistent storage resources to store and/or access one or more hierarchical data structures to perform techniques like organization management, identity management, or rights/authorization management. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 210 may be an application configured to interact directly with network-based services platform 200. In some embodiments, client 210 may be configured to generate network-based services requests according to a Representational State Transfer (REST)-style network-based services architecture, a document- or message-based network-based services architecture, or another suitable network-based services architecture.

In some embodiments, a client 210 may be configured to provide access to network-based services to other applications in a manner that is transparent to those applications. For example, client 210 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to provider network 200 may be coordinated by client 210 and the operating system or file system on behalf of applications executing within the operating system environment.

Clients 210 may convey network-based services requests (e.g., access requests directed to hierarchical data structures in directory storage service 220) to and receive responses from network-based services platform 200 via network 260. In various embodiments, network 260 may encompass any suitable combination of networking hardware and protocols necessary to establish network-based-based communications between clients 210 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 210 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and network-based services platform 200. It is noted that in some embodiments, clients 210 may communicate with network-based services platform 200 using a private network rather than the public Internet.

Different types of hierarchical data structures may be stored, managed, and or represented in different ways. FIG. 4A is a block diagram illustrating one example of a data model for a hierarchal data store that provides versioned hierarchical data structures, according to some embodiments. A node may be the basic element of a hierarchical data structure, such as directory structures 410a or 410n and may be represented with circles or squares in the graph depicted of FIG. 4A (e.g., nodes 400, 401, 402, 403, 404, 405, 406, 407, and 421). A node may have a globally unique identifier (GUID), zero or more attributes (key, value pairs), and zero or more links to other nodes. In some embodiments, a directory may be one type of node which has zero or more child links to other nodes, either directories or resources. Directory nodes may have zero or one parent directory node, implying that directory nodes and inks define a tree structure, in some embodiments. In FIG. 4A, node 401 is an example of a directory node. Node 400 may be a root node that is the logical root multiple directory structures 410 and may not be visible to clients of directory storage service 220. Resource nodes (represented by squares such as resource nodes 404, 405, 406, and 407) may be leaf nodes in a directory structure 410. A resource node may have a unique external Id (e.g., client specified) and client-defined attributes. Resource nodes can have more than one parent node (which would allow for some hierarchical data structures to be configured as a Directed Acyclic Graph (DAG). Node 405 in FIG. 4 is an example of a resource node and it has two parents (nodes 402 and 403).

In some embodiments, multiple types of resource nodes may be implemented. For example, in some embodiments, policy nodes may be a type of resource node with two user-defined attributes: a policy type and policy document (e.g., describing a policy applied to applicable nodes). For example, resource node 406 in FIG. 4A may be an example of a policy resource node. Another type of resource node may be an index resource node. For example, an index resource node be an index on various attributes values of nodes in the child nodes and other descendant nodes of the directory node to which the index node is attached. For example, if resource node 407 is an index node, then index node 407 may provide an index node for the attributes of child nodes 402 and 403 as well as descendant nodes 404, 405, and 406.

In some embodiments, a link may be a directed edge between two nodes defining a relationship between the two nodes. There may be many types of links, such as client visible link types and another link type for internal operation implementation. In some embodiments, a child link type may create a parent-child relationship between the nodes it connects. For example, child link 'bb' connects node 401 and node 403. Child links may define the hierarchies of directory structures 410. Child links may be named in order to define the path of the node that the link points to. Another type of client visible link may be an attachment link. An attachment link may apply a resource node, such as a policy resource node or index resource node, to another resource node or directory node. Attachment links may not define the hierarchical structures of directory structures 410. For example, attachment link 'xx' applies the policy attribute stored in policy resource node 406 to directory node 402. Nodes can have multiple attachments. In some embodiments, some attachment restrictions may be enforced, such as a restriction that not more than one policy resource node of any given policy type can be attached to a same node. A non-client visible type of link or implied link type may also be implemented in some embodiments, a reverse link. Reverse links may be used for optimizing traversal of directory structures 410 for common operations like resource node look-ups (e.g., policy lookups). Directory storage service 220 may maintain reverse links in the opposite direction of child and attachment links.

In various embodiments, nodes in directory structures 410 can be identified and found by the pathnames that describe how to reach the node starting from the logical root node 400, starting with the link labeled "/" and following the child links separated by path separator "/" until reaching the desired node. For example, node 405 can be identified using the path: "/directoryA/aa/dd". As some nodes may be children of multiple directory nodes, multiple paths may identify an For example, the following path can also be used to identify node 405: "/directoryA/bb/ee". As directory structures 410 may be a collection of nodes whose boundary is defined by the hierarchy of those nodes in the collection (e.g., the resulting hierarchical data structure, such as the tree or DAG created by the links between nodes). In this way, directory structures 410 may represent separate, independent, or partially independent, organizations.

To store the illustrated directory structures in current hierarchical data structure store 320 and historical hierarchical data structure store 330, the described nodes, links attributes, and the like may be modeled after a Resource Description Framework (RDF) data, in some embodiments. To maintain multiple versions of the hierarchical data structures, versioning information may also be included to express how the data has changed over time. RDF data may be structured as (Subject, Predicate, Object) tuples. When including additional versioning information this structure may become: (Subject, Predicate, Object, Version, PreviousVersion). To represent the hierarchical data structures based on RDF, there may be multiple types of RDF predicates. In some embodiments, one type of RDF predicates may represent links of the hierarchical data structure and another type of RDF predicates may represent attributes of the hierarchical data structure. Different types of predicts may represent the hierarchical data structure differently. Link predicates may be between two Nodes, whereas attribute predicates may be between a node and a value. Since a single node might participate in several predicates of the same type, but with different values, predicates may begin with a common prefix and end in some additional type or naming information to aid in lookups. For example, the version entry in a tuple of a predicate may be the logical timestamp (e.g., transaction sequence number) at which the link or attribute was created, as all changes to a hierarchical data structure may utilize the transaction resolution process provided by transaction log storage 250 and may be assigned an ordered logical timestamp by transaction log storage 250.

As noted above in FIG. 3, hierarchical storage nodes may maintain a current version of a hierarchical data structure and past versions of a hierarchical data structure. In at least some embodiments, different respective tables may be maintained for each hierarchical data structure, one table that stores the data for the current version, such as current version table 450 in FIG. 4B, and another table that stores immutable records for the previous versions, such as prior version table 460 in FIG. 4C. Using the example directory structure 410a in FIG. 4A, table 450 and table 460 may illustrate the content of the current and previous version tables. Instead of GUID values, the table shows GUID 401, GUID 402 etc. for readability. While predicate names may be shown as strings, the actual representation in the store may use a binary representation that will be more compact than string representation. Current version table 450 may store the latest version data for each row in the table and the value in the previous version column may provide the index into previous version table 460 in order to locate the previous value for this row. In previous version table 460, the current version may be appended to the predicate so that it can be filtered upon. The previous version column in previous version table 460 may allow for a storage engine to locate older versions, further back in logical time to perform various access requests, such as access requests to operate on a hierarchical data structure at a specified point-in-time. Note that while the structure of tables 450 and 460 may be shown as relational tables, such an illustration is not limiting. For example, as noted above the current version hierarchical data structure store 320 and historical hierarchical data structure store 330 may be key value stores that are non-relational, where the key is formed by concatenation of subject and predicate values and where the value may be formed by the concatenation of the rest of the column values illustrated. For example, the first row in table 450 may be represented logically as the following <Key,Value> pair: <GUID_401+link.child.aa, GUID_402+Ver_1+Null>.

In various embodiments one or both tables 450 and 460 may be accessed to perform various operations. For example an access request may specify a query: "Find all children for Node whose ID is GUID_401 select GUID_401.child.* from CurrentVersion" or a query: "Find all policies for a resource Node who's ID is GUID_405 along all paths to the root. To service such queries, a depth first traversal may be executed along the parent links. At each node along the path to the root, the following internal queries may be executed: internal query 1: "Find if the Node has policies: select GUID_405.link.HasPolicy.* from CurrentVersion," internal query 2: "If the node has policies returned in internal query 1, use the value from the link to get the policy document value from the policy node: select GUID_406.link.PolicyDoc from CurrentVersion," internal query 3: "Find all parents for current node and perform internal queries 1-3 for each parent node until reaching the root of the directory structure. Please note that previous examples are not intended to be limiting as to the format, structure, syntax, or other ways in which queries may be expressed or processed with respect to tables 450 and 460.

FIG. 5 is a block diagram illustrating the use of a separate transaction log store to provide consistent storage for versioned hierarchical data structures, according to some embodiments. Multiple clients, such as clients 510a, 510b, and 510c may perform various access requests to a hierarchical data structure concurrently, such as various write requests 512a, 512b, 512c. In a least some embodiments, replica group 520 may include multiple storage nodes, such as hierarchy storage node 522a, 522b, and 522c that maintain versions of the hierarchical data structure that are available for servicing various access requests from clients 510. For example, clients 510 may submit different write requests 512 to hierarchy storage nodes 522 according to a routing schema which may direct access requests from each client to a different storage node in replica group 520 according to a load balancing scheme. Upon receiving the request, each hierarchy storage node 522 may perform various operations upon a current version of the hierarchical data structure at the storage node, then offer the writes 524 to transaction log storage 210 for commitment to directory structure log 530 including various information such as the affected or accessed data by performing the write request, the write request itself, and a transaction sequence number of other indication identifying the point-in-time of the current version of the hierarchical data structure at the storage node 522. Indications of commitment 526 or conflict may be provided to the respective storage nodes 522. For those writes that are committed, the directory structure log may be read (as discussed below with regard to FIG. 13) and committed writes applied 532 to the respective versions of the hierarchical data structure maintained at storage nodes 522.

In some embodiments, archival management 236 may also read the directory structure log 530 to retrieve writes 534 for transmission as archived transactions or snapshots. Archival management 236 may then periodically or aperiodically update 542 an archived log 540 in archive storage service 270 and generate and send new snapshots 552 to be maintained as part of archived snapshots 550. In this way, the hierarchical data structure can be recreated at any point-in-time, for example by loading a snapshot onto a storage node and applying transactions from archived log 540 to reach a certain transaction sequence number so that the version of the hierarchical data structure at the storage number is consistent with a specified point-in-time.

Figure 6:
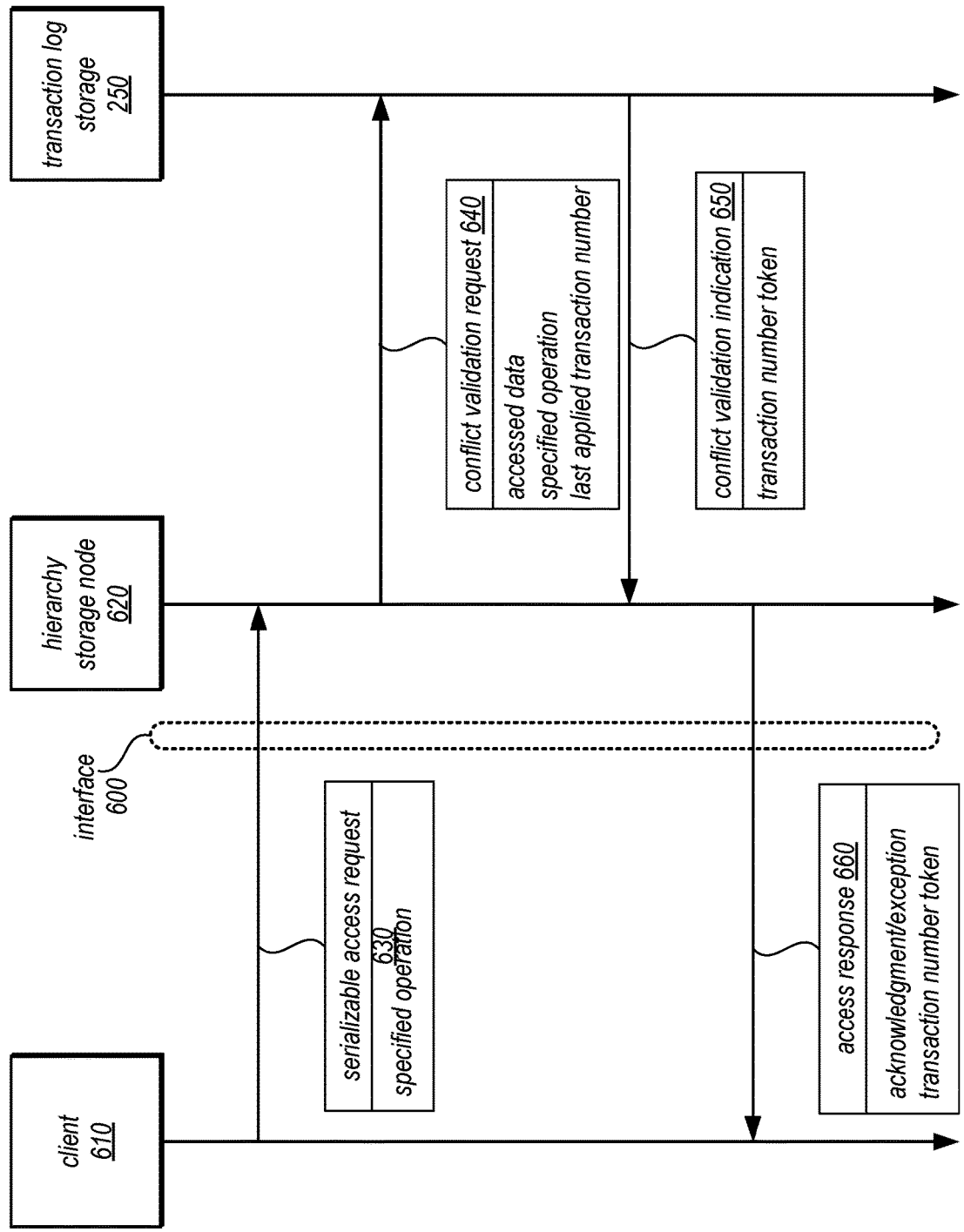
FIG. 6 is a sequence diagram illustrating processing of an access request with serializable isolation utilizing transaction log storage, according to some embodiments.

FIG. 6 is a sequence diagram illustrating processing of an access request with serializable isolation utilizing transaction log storage, according to some embodiments. Hierarchy storage node 620, and other storage nodes discussed in FIGS. 7-11, may implement interface 600 to handle requests from clients. In various embodiments, interface 600 may be a programmatic interface (API) which may be invoked by command line, graphical user interface, or other interface control/generation components at client 610. Serializable access request 630 may be a request, such as an access request that changes data in the hierarchical data store, or a request that reads data from the consistent version across the entire distributed data store for the hierarchical data structure is performed. Request 630 may include the specified operation to perform (e.g., read or write operation). Once received, hierarchy storage node 620 may access an identified version of the hierarchical data structure (e.g., the current version) and determine the exact changes to be made to the hierarchical data structure to perform the operation, including the accessed (read) and/or affected (written) data, such as the nodes, links, attributes, etc., read or changed) Hierarchical storage node 620 may then construct a conflict validation request 640 to send to transaction log storage 250 for evaluation that includes the accessed/affected data, the specified operation, and the last applied transaction number of the hierarchical data structure at hierarchical storage node 620.

Transaction log storage 250 may perform conflict analysis to determine whether the prospective transaction in conflict validation request 640 may be performed without conflict with committed transactions in the transaction log. Conflicting transactions may occur when the presumed state of a transaction (e.g., data read and used to perform the transaction) is changed by another transaction prior to the completion and commitment of the transaction (e.g., optimistic concurrency). A conflict validation indication 650 may be provided by transaction log storage 210 to hierarchy storage node 620 to indicate whether or not the transaction committed (or was in conflict and thus rejected). Hierarchical storage node 620 may pass on the acknowledgment of committal (and the transaction number token indicating the transaction sequence number for the transaction) or the exception or denial of the request 660.

Figure 7:
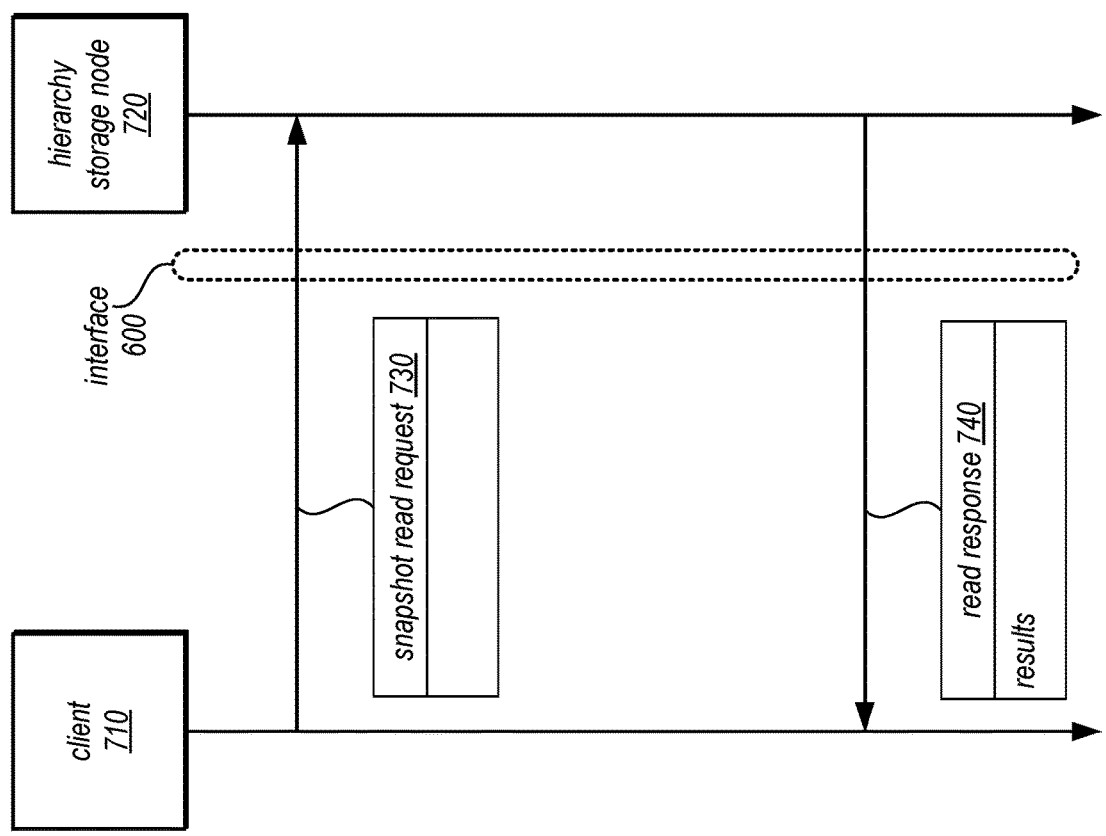
FIG. 7 is a sequence diagram illustrating processing of an access request with snapshot isolation utilizing a version of a hierarchical data structure maintained at a storage node, according to some embodiments.

FIG. 7 is a sequence diagram illustrating processing of an access request with snapshot isolation utilizing a version of a hierarchical data structure maintained at a storage node, according to some embodiments. For snapshot read request, no access to the transaction log storage is performed. Instead, the most recent or current version of the hierarchical data structure is accessed to service the read request. Client 710 may send the snapshot read request 730 to hierarchical storage node 720. Hierarchical storage node 720 may identify that the request is a snapshot read and proceed to process the request utilizing the current version of the hierarchical data structure. Then hierarchal storage node 720 may send the read response 740 indicating the results of the read request.

Figure 8:
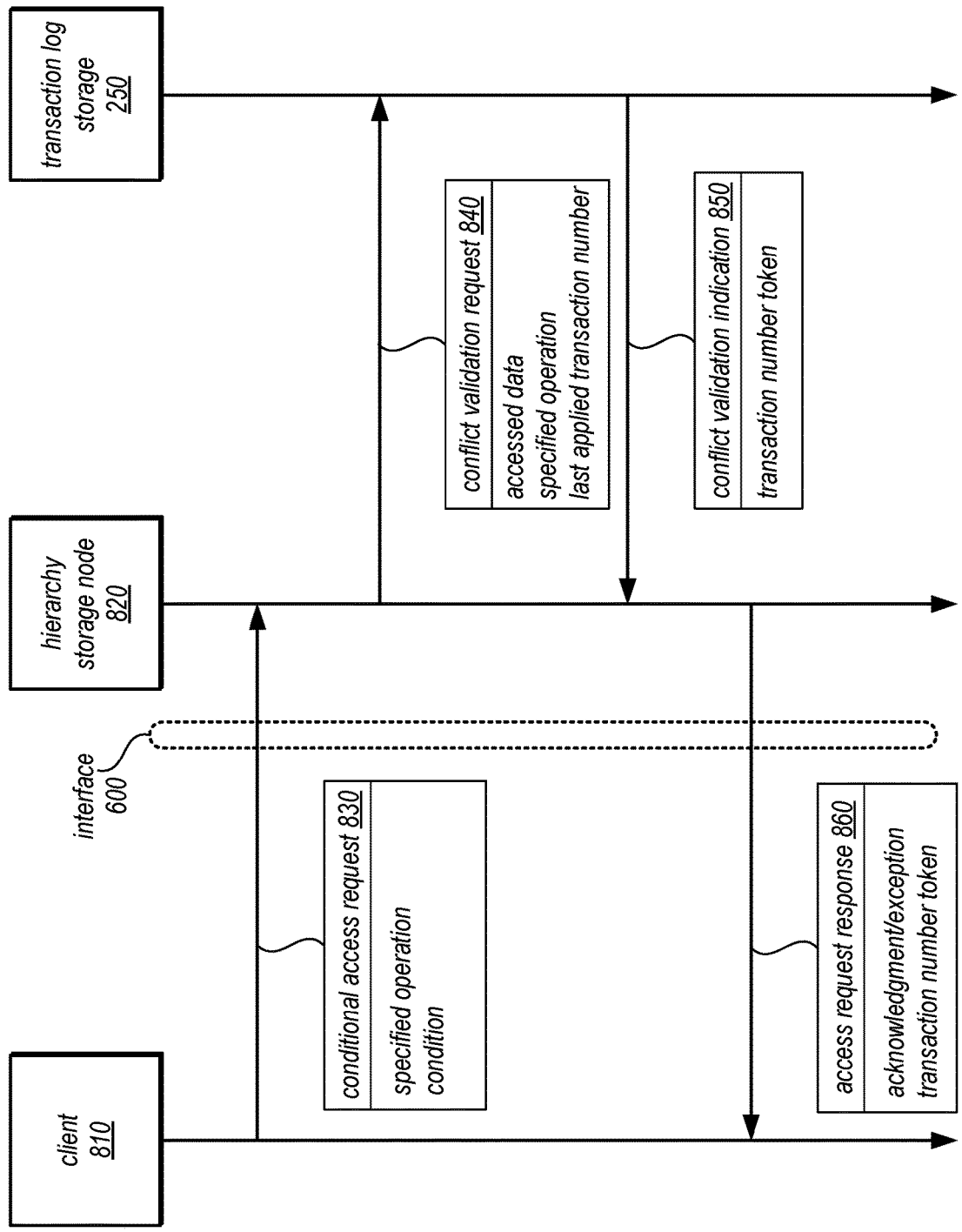
FIG. 8 is a sequence diagram illustrating processing of a conditional access request with serializable isolation utilizing transaction log storage, according to some embodiments.

FIG. 8 is a sequence diagram illustrating processing of a conditional access request with serializable isolation utilizing transaction log storage, according to some embodiments. In some instances, access requests may be predicated upon the satisfaction of a condition for the hierarchical data store. For example, an expected condition may identify a particular point-in-time (logical time) or point at which the hierarchical data structure on the storage node has progressed (e.g., if the last applied sequence number is greater than X). In another example, the expected condition may be based on expected data value(s) for nodes, attributes, etc., of the hierarchical data structure. The expected condition may be included along with a specified operation (e.g., read or write)

as part of conditional access request 830 sent to hierarchy storage node 820. Hierarchy storage node 820 may evaluate the condition and if satisfied proceed to process the access request similar to a serializable access request as discussed above in FIG. 6, by sending a conflict validation request 840 to transaction log storage 250 that includes accessed data, the specified operation, and the last applied transaction number of the hierarchical data structure at hierarchy storage node 820. Transaction log storage 250 may then commit or reject as conflicted the transaction in conflict validation indication 850. Hierarchy storage node 820 may then send the access request response 860, indicating acknowledgment or denial of the request and the transaction number token. Response 860 may also be sent indicating a condition failure (e.g., that the hierarchical data structure did not satisfy the condition.

Figure 9:
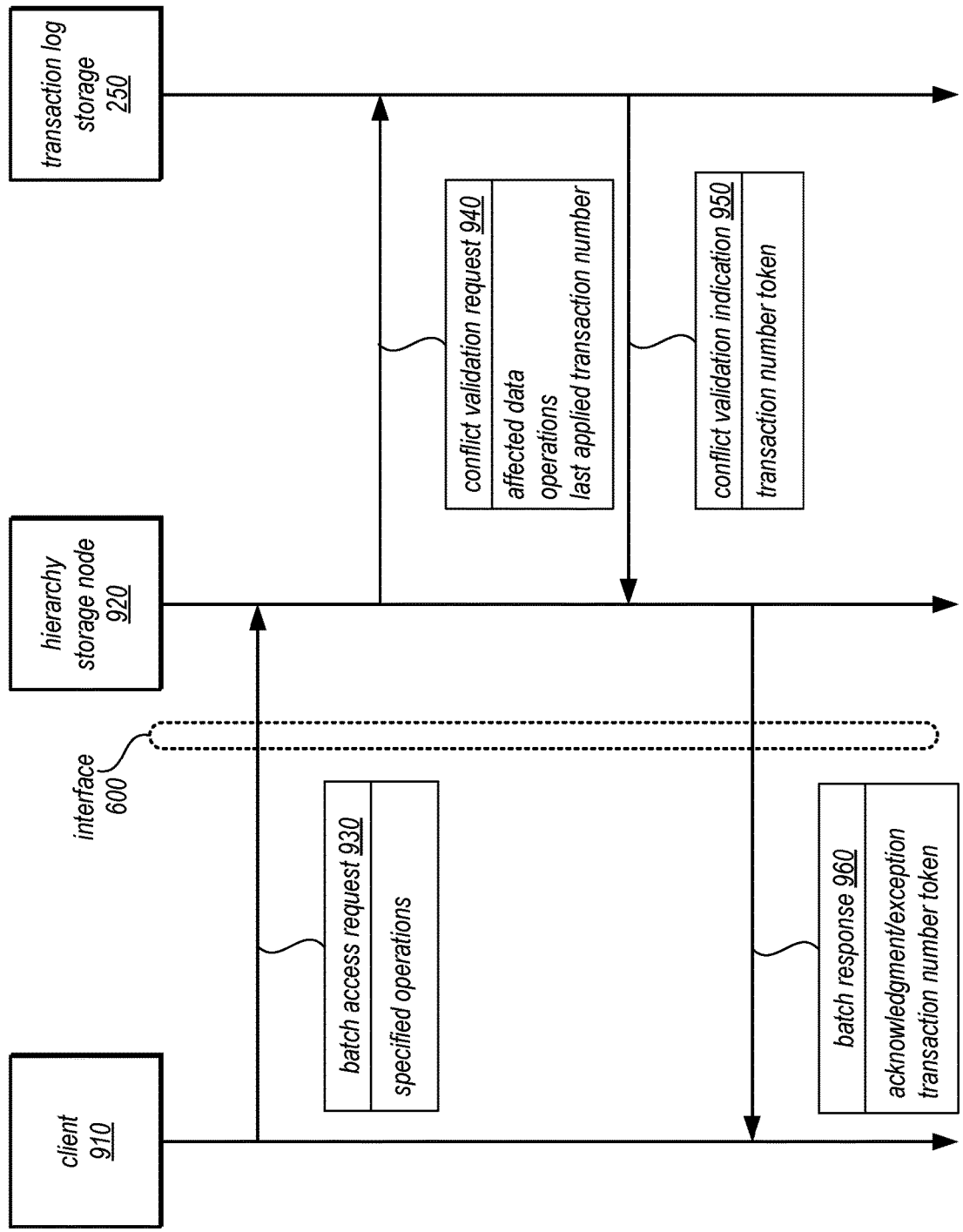
FIG. 9 is a sequence diagram illustrating processing of a batch access request with serializable isolation utilizing transaction log storage, according to some embodiments.

FIG. 9 is a sequence diagram illustrating processing of a batch access request with serializable isolation utilizing transaction log storage, according to some embodiments. In some scenarios, multiple operations of a same or different type (e.g., read operations, write operations or read and write operations) may be performed to make a large scale change to a hierarchical data structure (e.g., moves to rebalance or rearrange a subtree within the hierarchical data structure). As indicated in FIG. 9, client 910 may send a batch access request 930 with specified operations to commit or fail together. For example, batch access request 930 may include multiple requests to create different nodes in a hierarchical data structure. In at least some embodiments, the performance of an operation in the batch access request 930 may be dependent upon the successful performance of another operation in the batch access request in order to be performed. For example, batch access request 930 may include operations to create three nodes and then other operations to attach or link the three nodes together. The attach operations may be dependent upon the success of the creation operations (which if fail then the attach operations will not succeed either). In another example, data generated as a result of one or more of the operations (e.g., identifiers or other metadata about the creation of the nodes) may be used as input into other operation(s). Various other operations that depend upon the result of other operations in the batch request may be included, and thus the previous examples are not intended to be limiting. Hierarchy storage node 920 may submit a conflict validation request 940 that includes the multiple operations, affected/accessed data (e.g., resource nodes, directory nodes, links, etc.), and a last applied transaction number for the current version of the hierarchical data structure at hierarchy storage node 920. Transaction log storage 250 may perform a conflict validation on the entire set of operations and either commit or reject the entire set of operations in conflict validation indication 950. Hierarchy storage node 920 may then provide batch response 960 to client 910 in order to indicate whether the batch operations have been acknowledged as committed (including a transaction number token) or denied.

Figure 10:
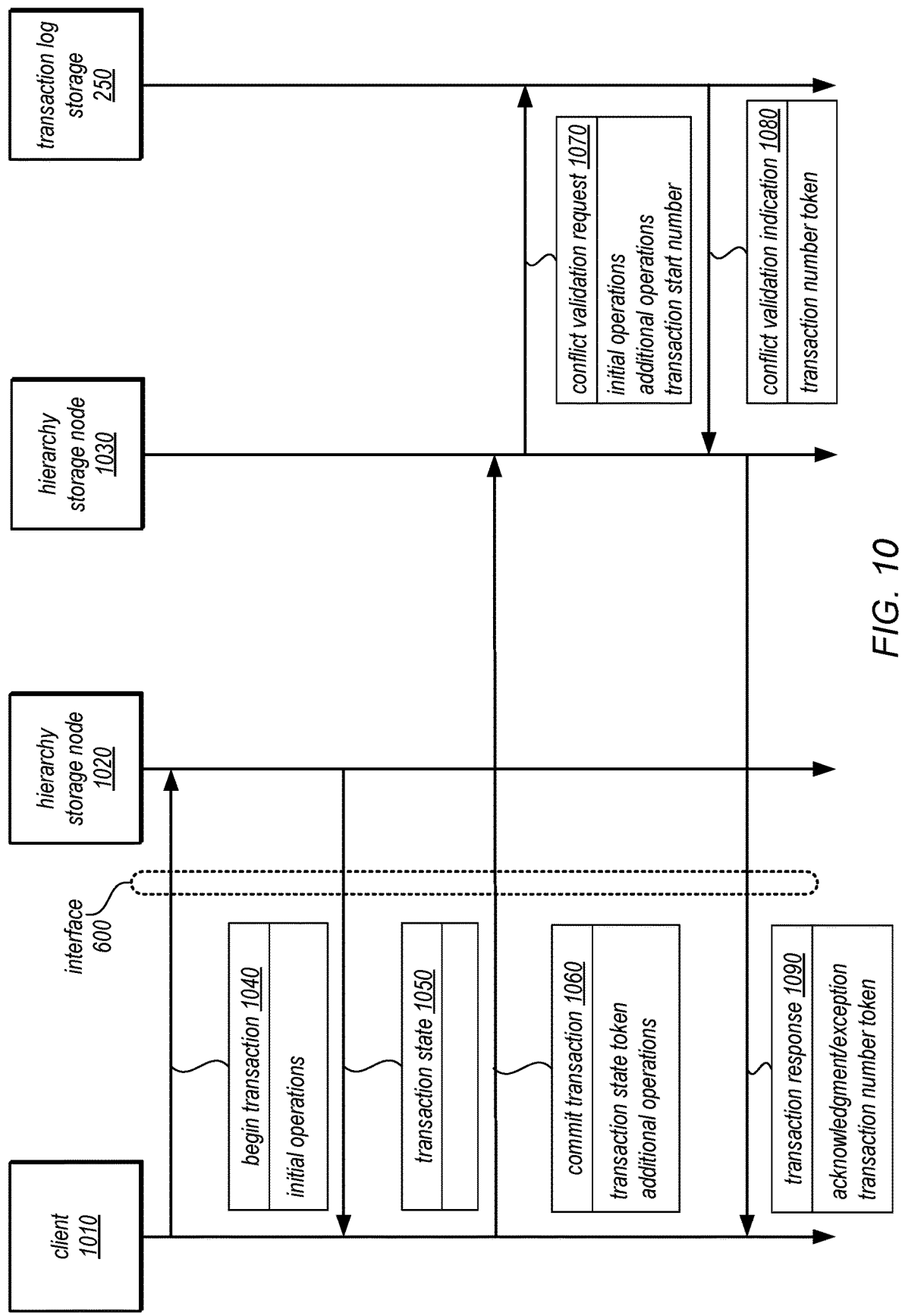
FIG. 10 is a sequence diagram illustrating processing of client-specified transaction request with serializable isolation utilizing transaction log storage and a transaction state token, according to some embodiments.

FIG. 10 is a sequence diagram illustrating processing of client-specified transaction request with serializable isolation utilizing transaction log storage and a transaction state token, according to some embodiments. Instead of grouping like operations as a single batch, a client-specified transaction may be performed so that a client can perform multiple access requests as part of the same transaction without having to commit the requests until the end. In this way, various contingent or conditional scenarios may be accounted for so that the transaction could be aborted (not illustrated) if not all of the access requests perform as desired. Moreover, transaction state may be passed from client to hierarchy storage node so that no one storage node has to handle the client-specified transaction (e.g., without a sticky session), but the work can be spread among multiple hierarchy storage nodes. For example, client 1010 may send a request 1040 to begin a transaction including multiple initial operations to hierarchy storage node 1020. Hierarchy storage node 1020 may perform the initial operations and return results in the form of transaction stage 1050.

Client 1010 may then evaluate transaction state 1050 to determine next steps. For example, the transaction state 1050 may include data read from the hierarchical data structure which may or may not be the expected or desired state for client 1010. If so, then client 1060 may proceed to commit the transaction and may include additional operations in commit transaction request 1060, which includes transaction state token (generated from the transaction state information 1050) and additional operations (if desired). Because transaction state token contains all of the necessary information from another storage node to perform the transaction, load balancing techniques to evenly distributed requests may be implemented and may direct commit transaction request 1060 to hierarchy storage node 1030. Hierarchical storage node 1030 may then generate and send the conflict validation request 1070 to transaction log storage 250 for conflict evaluation. Transactions state token may include the transaction sequence number of the hierarchical data structure at the time the transaction was begun at hierarchical storage node 1020 and may include the transaction start number (e.g., the transaction sequence number) in the conflict validation request. Transaction storage log 210 may then send a conflict validation indication 1080 to hierarchy storage node 1030 which in turn may acknowledge whether the transaction committed or an exception triggered in response 1090. In some embodiments, a transaction number token may be included to indicate the sequence number of the transaction that was committed.

Figure 11:
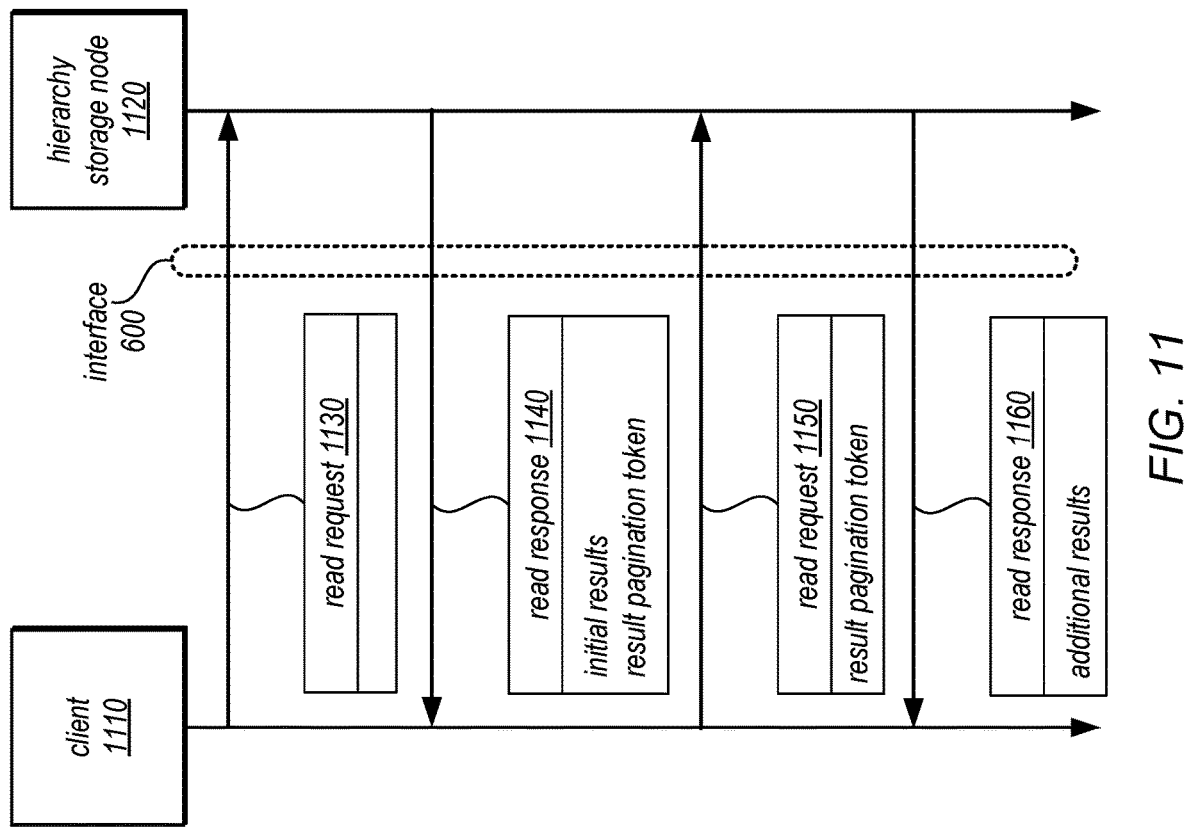
FIG. 11 is a sequence diagram illustrating processing of an access request with paginated results delivery utilizing a pagination token, according to some embodiments.

FIG. 11 is a sequence diagram illustrating processing of an access request with paginated results delivery utilizing a pagination token, according to some embodiments. In some scenarios, results generated by a query, or other access request are too large to send in a single response message. Rather than tying up individual hierarchy storage nodes with certain clients so that state is maintained at the storage node while the client is retrieving the data, pagination techniques may be utilized in order to allow a client to retrieve results from any storage node without requiring a sticky session with a single storage node. For example, as illustrated in FIG. 11, client 110 sends a read request 1130 via interface 600 that results in a large data set (e.g., a query to retrieve all user nodes that are male). Instead of providing a stream of read responses that require hierarchy storage node 1120 to idle or maintain result processing state, read response 1140 may include initial results and a result pagination token. The result pagination token may indicate remaining results to be retrieved and how to retrieve them. In some embodiments, result pagination token may be modified by the client to change the consistency and/or isolation levels used to perform the read operation so that remaining results may be modified according to the changed version accessed as result of the change to the consistency and/or isolation levels. Client 1110 may then send another read request 1150 with the result pagination token to hierarchy storage node 1120 or another hierarchy storage node. Hierarchy storage node 1120 may then identify additional results to provide and include them a in subsequent response 1160 based on the information provided in the result pagination token. Such a technique could be performed for many iterations until an entire result set is provided to client 110.

Figure 12:
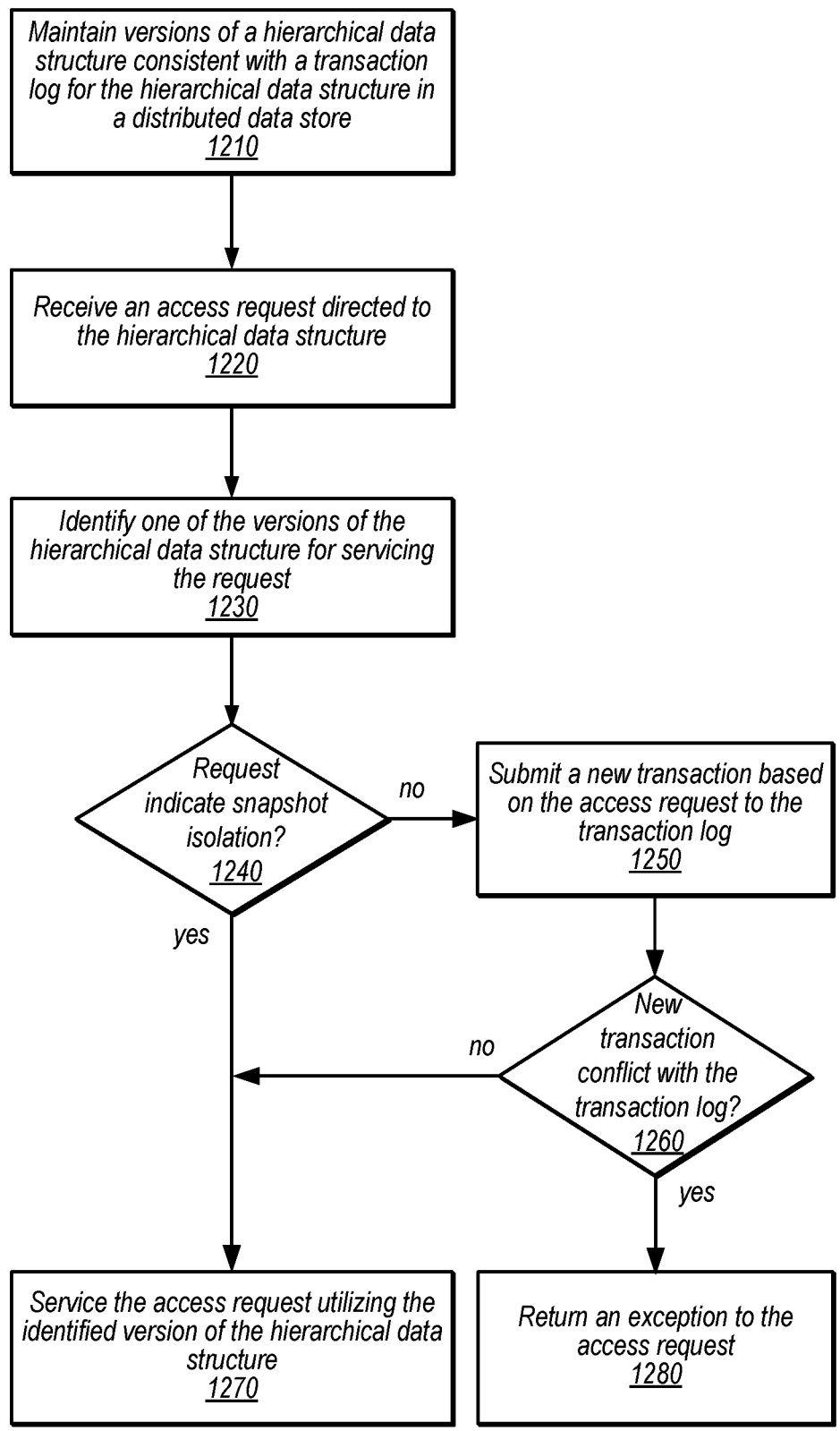
FIG. 12 is a high-level flowchart illustrating methods and techniques to implement versioned hierarchical data structures to service access requests, according to some embodiments.

The directory storage service, access requests, and other techniques discussed in FIGS. 2 through 11 provide examples of a distributed data store storing a hierarchical data structure for a client and providing access to multiple versions of a hierarchical data structure in different scenarios. However, various other types of distributed storage systems may implement multiple versions of the hierarchical data structure, which may utilize other numbers of types of components, which may provide distributed data storage. FIG. 12 is a high-level flowchart illustrating methods and techniques to implement versioned hierarchical data structures to service access requests, according to some embodiments. Various different distributed data stores including the embodiments described above may implement the techniques described below.

As indicated at 1210, versions of a hierarchical data structure may be maintained consistent with a transaction log for the hierarchical data structure in a distributed data store. For example, different numbers of storage nodes may independently maintain local copies or replicas of a hierarchical data structure as part of a replica or protection group. Each storage node may maintain the same or different versions of the hierarchical data structure. In some embodiments, storage nodes may implement an eventually consistent consistency model which guarantees that each storage node may eventually be consistent with updates to a hierarchical data structure performed at any other storage node. For example, the transactional log for the hierarchical data structure may act as a consistency mechanism, ordering and isolating transactions so that conflicting transactions are not allowed (e.g., utilizing optimistic concurrency). In some embodiments, transactions indicated as not conflicting are committed to the transaction log and reported as committed dot the submitting storage node. A storage node may then apply the transaction, in some embodiments, whereas in other embodiments, the storage node may apply the transaction at a later time, as discussed below with regard to FIG. 13.

Overtime, storage nodes may acquire many different versions corresponding to different points in time (e.g., logical time) with respect to the transaction log. Thus when an access request is received directed to the hierarchical data structure, as indicated at 1220, one of the versions may need to be selected for processing the access request. Many different types of access requests may be received. For instance, some access requests may be queries or other read requests to obtain certain data, attributes, values or other information stored or represented by the hierarchical data structure (e.g., queries which may executed by utilizing an index attribute or queries to determine a directory path to a particular node, such as a resource). As illustrated above with regard to FIGS. 6-11, access requests may be transactions or batches, conditional, or may specify a particular isolation level (e.g., serializable or snapshot) to perform when processing the access request. The access request may explicitly (e.g., by including a transaction sequence number or token) identify the version of the hierarchical data structure to utilize or implicitly based on the type of access request (e.g., a snapshot read utilizes the current version at a storage node). Thus, as indicated at 1230, one of the versions of the hierarchical data structure for servicing the request may be identified.

The request may indicate the level of isolation and/or the level of consistency to perform when processing the request, as indicated at 1240. For example, the type of request may indicate snapshot isolation (e.g., by requesting a particular kind of query or lookup operation). If snapshot isolation is indicated, then as illustrated by the positive exit from 1270, the access request may be serviced utilizing the identified version of the hierarchical data structure, without invoking the transaction log. In this way, some access requests for which a small likelihood of stale (but still consistent) data is tolerable may be able to leverage the high speed of performing a local operation without further networking communications. In at least some embodiments, the identified version for a snapshot isolation request may be maintained in memory in order to perform high-speed processing for the request. In some embodiments, the request may indicate that dirty or inconsistent reads of individual portions of the hierarchical data structure is acceptable, indicating an isolation level that is less than snapshot isolation. In some embodiments, the request may indicate a specific point-in-time (e.g., by including a transaction sequence number) offering a different isolation level than snapshot isolation. Various combinations of isolation and consistency and consistency level may be specified by clients and thus previous examples are not intended to be limiting.

Figure 13:
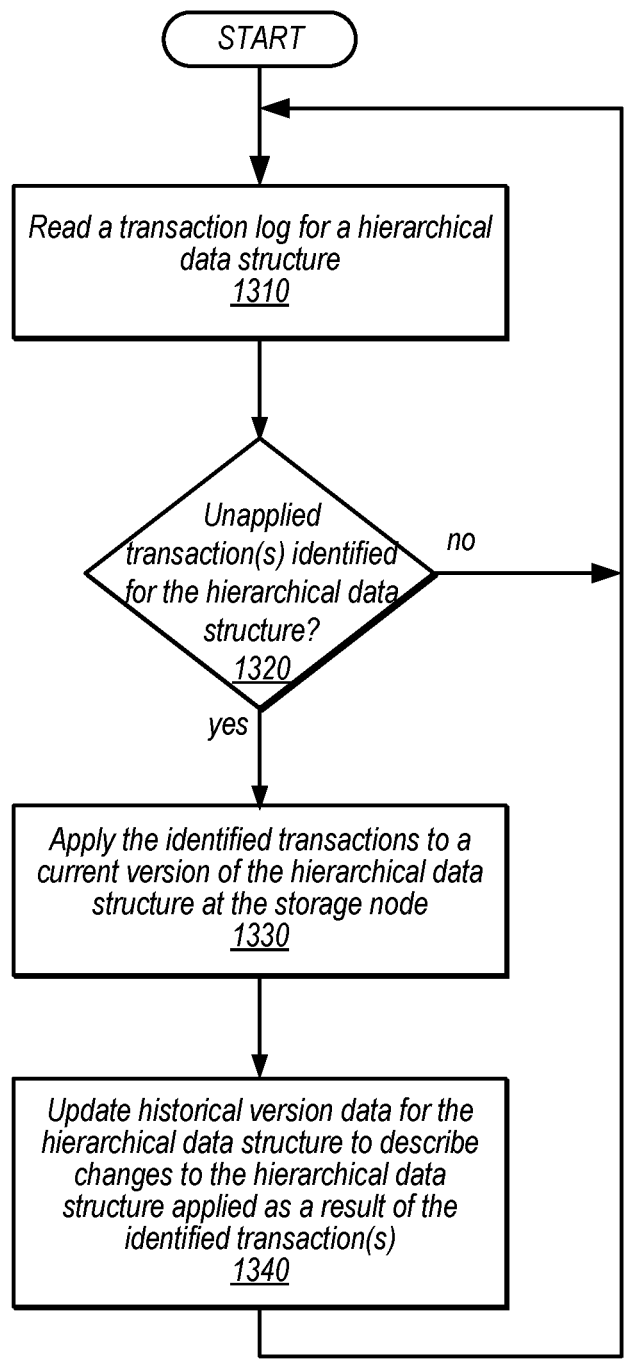
FIG. 13 is a high-level flowchart illustrating methods and techniques to implement maintaining versions of a hierarchical data structure at storage nodes consistent with a transaction log for the hierarchical data structure, according to some embodiments.

As indicated by the negative exit from 1240, if snapshot isolation is not indicated, then a serializable isolation may be enforced utilizing the transaction log. Note that in some embodiments, the request may need to explicitly (or implicitly) invoke the appropriate isolation level and thus it may not be (as illustrated in FIG. 13) that access requests without snapshot isolation indicated are always processed with serializable isolation. As indicated at 1210, a new transaction based on the access request may be submitted to the transaction log. For example, affected nodes, objects, or and/or other information describing the changes in the transaction may be supplied so that conflict detection can be performed. The transaction log may perform conflict detection analysis to determine if the transaction conflicts with an already committed transaction. If yes, as indicated by the positive exit from 1260, then an exception, denial, or other error indication may be returned to the client that sent the access request, as indicated at 1280. In some embodiments, the exception may indicate the conflict (including specifically conflicting operations, such as changes to a particular resource node). If however, as indicated by the negative exit from 1260, the transaction does not conflict, then a committed indication has been provided for the new transaction. The commitment acknowledgment may include a sequence number indicating the transaction's location within the transaction log. As part of servicing the request, the access request may utilize the identified version, as indicated at 1270. For read operations this may include sending data found in the identified version. For write operations, servicing the access request may include providing an acknowledgment that the write operation is committed.

FIG. 13 is a high-level flowchart illustrating methods and techniques to implement maintaining versions of a hierarchical data structure at storage nodes consistent with a transaction log for the hierarchical data structure, according to some embodiments. As indicated at 1310, a transaction log for a hierarchical data structure may be read, in various embodiments. For example, access requests to the transaction log may be performed starting with a transaction sequence number which identifies the most recent transaction applied to the current version of the hierarchical data structure at a storage node. As indicated at 1320, unapplied transaction(s) for the hierarchical data structure may be identified. For example, transactions that have been committed more recently than the (e.g., with higher transaction sequence numbers) may be identified and obtained from the transaction log.

As indicated at 1330, the identified transactions may then be applied to a current version of the hierarchical data structure at the storage node. For example, the transactions may describe the changes performed as part of the transaction (such as the operations to add, remove, move, or modify resources, directories, attributes, links, or other portions of the hierarchical data structure). The corresponding entries in the key value or other store maintaining/describing the changed objects may be updated to reflect the changes (e.g., by adding an additional attribute to an object, changing an attribute value, adding a new attribute, etc.). Once the identified changes are complete, then in some embodiments, a transaction sequence number corresponding to the applied transaction may then be recorded in metadata or other information indicating the version of the hierarchical data structure (e.g., increasing the stored sequence number to the higher transaction sequence number).

As indicated at 1340, in some embodiments, historical version information for the hierarchical data structure may be updated to describe the changes applied as a result of the hierarchical transaction. In this way, a prior version of the hierarchical data structure (before the application of the transaction) can be generated, accessed, deduced, reconstructed, etc. For example, as discussed above with regard to FIGS. 3 and 4, the historical data store for hierarchical data structures may be represented as a key value store that stores prior versions of objects stored in the current version of the hierarchical data structure. The prior version object may be a copy of the object that was changed by the transaction along with a version number to identify the prior object version relative to the current object version. A pointer, link, or index value to the prior object version may be included in the current object version. Similarly, a pointer, link, or index to object versions older than the immediately prior object version, creating a chain of object versions that may be followed until an original version may be reached.

As illustrated by the loop back arrow from 1340 (and the negative exit from 1320), the transaction log may be evaluated multiples times to ensure that the versions of a hierarchical data structure maintained on a storage node are eventually consistent with the transaction log. For example, transaction logs reads may be performed periodically, or upon the trigger of an event (e.g., processing of a number access requests at the storage node).

The methods described herein may in various embodiments be implemented by any combination of hardware and software. For example, in one embodiment, the methods may be implemented by a computer system (e.g., a computer system as in FIG. 14) that includes one or more processors executing program instructions stored on a computer-readable storage medium coupled to the processors. The program instructions may be configured to implement the functionality described herein (e.g., the functionality of various servers and other components that implement the directory storage service and/or storage services/systems described herein). The various methods as illustrated in the figures and described herein represent example embodiments of methods. The order of any method may be changed, and various elements may be added, reordered, combined, omitted, modified, etc.

Figure 14:
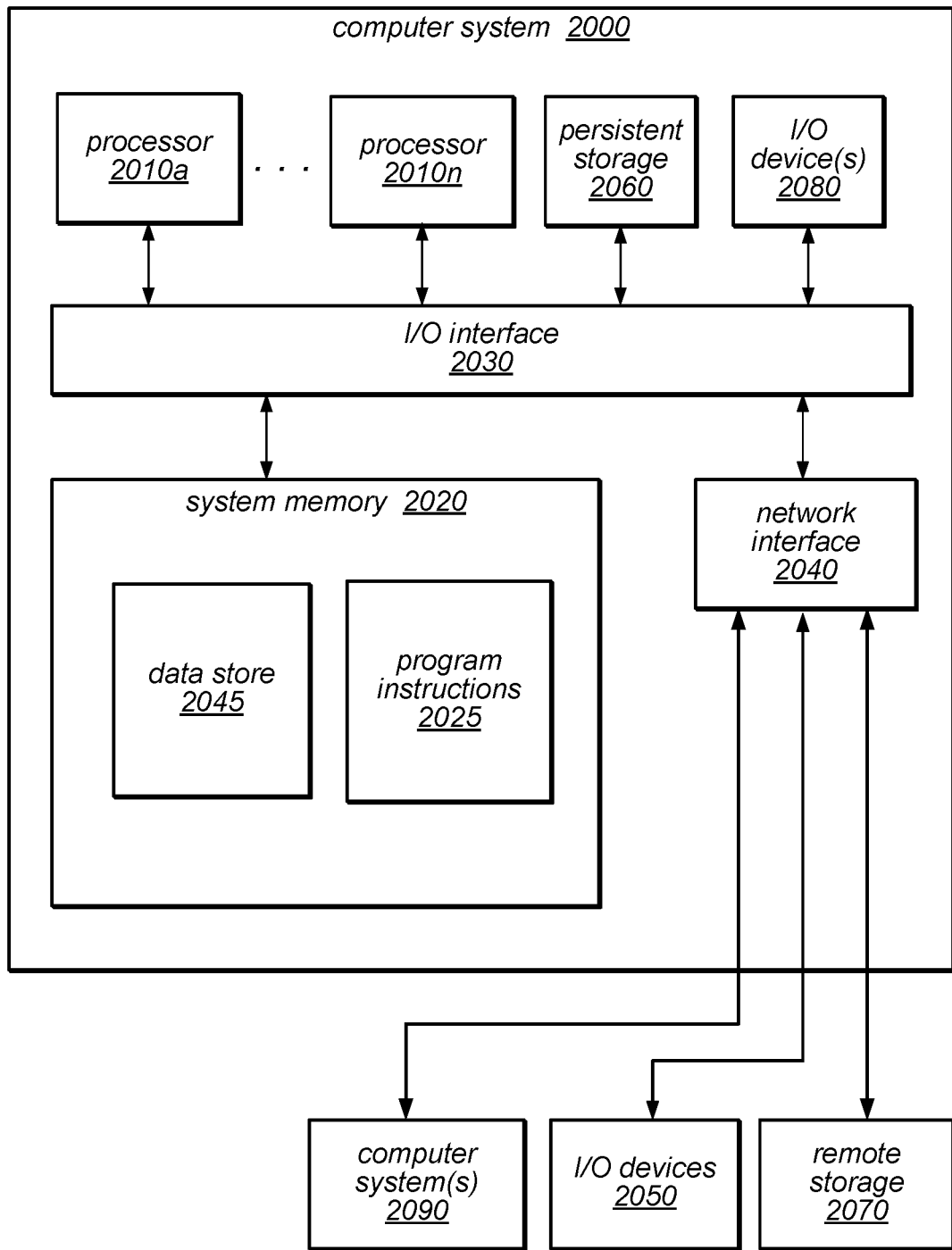
FIG. 14 is an example computer system, according to various embodiments.

FIG. 14 is a block diagram illustrating a computer system configured to implement the distributed data store providing versioned hierarchical data structures, according to various embodiments, as well as various other systems, components, services or devices described above. For example, computer system 2000 may be configured to implement hierarchy storage nodes that maintain versions of hierarchical data structures or components of a transaction log store that maintain transaction logs for hierarchical data structures, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the directory storage systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a hierarchy storage nodes that maintain versions of hierarchical data structures or components of a transaction log store that maintain transaction logs for hierarchical data structures, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/DIRECTORY STORAGE SERVICE 220-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. For example, the information described herein as being stored by the hierarchy storage nodes or transaction log store described herein may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement embodiments described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 14 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   a plurality of storage nodes, comprising a processor and a memory, that implement a hierarchical data store and store respective versions of a hierarchical data structure consistent with a transaction log for the hierarchical data structure;
   a transaction log store, that maintains the transaction log for the hierarchical data structure;
   one of the storage nodes, configured to:
      receive, from a client of the hierarchical data store, a request to commit a transaction to the hierarchical data structure, wherein the request includes:
         a transaction state sent to the client by another one of the storage nodes, wherein the transaction state was generated by the other one of the storage nodes, based on one or more prior operations performed by the other one storage node responsive to an earlier request sent from the client to the other one storage node to perform the one or more prior operations; and
         one or more additional operations to perform as part of the transaction begun by the earlier request to the other one storage node;
      request a conflict validation for the transaction including the one or more prior operations and the one or more additional operations from the transaction log store; and
      responsive to determining that the transaction does not conflict based on the conflict validation received from transaction log store, return a response to the request acknowledging that the transaction has been committed to the hierarchical data structure.

2. The system of claim 1, wherein responsive to determining that the transaction does not conflict, the one storage node is further configured to perform the one or more additional operations on a version of the hierarchical data structure stored at the one storage node.

3. The system of claim 1, wherein the one storage node is further configured to:
   receive a request to begin a second transaction including one or more further operations on the hierarchical data structure;
   perform the one or more further operations on the hierarchical data structure; and
   return a response to the request indicating a state of the second transaction as a transaction state token.

4. The system of claim 1, wherein the transaction state is a transaction state token that includes a transaction sequence number of the hierarchical data structure at a time the transaction was begun at the other storage node.

5. The system of claim 1, wherein the storage node and the other storage node are selected according to a load balancing scheme.

6. The system of claim 1, wherein the one storage node is further configured to:
   receive a request to commit another transaction to the hierarchical data structure that includes a second transaction state generated by the other one of the storage nodes based on another one or more prior operations performed by the other one storage node;
   request the conflict validation for the other transaction including the other one or more prior operations from the transaction log store; and
   responsive to determining that the transaction conflicts based on the conflict validation received from transaction log store for the other transaction, return a response to indicate that the other transaction failed to commit.

7. The system of claim 1, wherein the hierarchical data store is a network-based directory service, wherein the client is a client of the network-based directory service, wherein the storage nodes are multi-tenant storing one or more other hierarchical data structures maintained on behalf of one or more other clients of the network-based directory service, and wherein an identified version of the hierarchical data structure is maintained in the memory of the storage node.

8. A method, comprising:
   performing, by one or more computing devices:
      receiving, from a client of a distributed data store, a request to commit a transaction to a hierarchical data structure at a storage node of a plurality of storage nodes of a distributed data store, wherein the request includes:
         a transaction state sent to the client by another one of the storage nodes, wherein the transaction state was generated by the other one of the storage nodes, based on one or more prior operations performed by the other one storage node responsive to an earlier request sent from the client to the other one storage node to perform the one or more prior operations; and
         one or more additional operations to perform as part of the transaction begun by the earlier request to the other one storage node;

requesting, by the storage node, a conflict validation for the transaction including the one or more prior operations and the one or more additional operations from a transaction log for the hierarchical data structure; and responsive to determining that the transaction does not conflict based on the conflict validation received from transaction log store, returning, by the storage node, a response to the request acknowledging that the transaction has been committed to the hierarchical data structure.

9. The method of claim 8, wherein the method further comprises performing, by the storage node, the one or more additional operations on a version of the hierarchical data structure stored at the storage node.

10. The method of claim 8, further comprising:
receiving, at the storage node, a request to begin a second transaction including one or more further operations on the hierarchical data structure;
performing, by the storage node, the one or more further operations on the hierarchical data structure; and
returning, by the storage node, a response to the request indicating a state of the second transaction as a transaction state token.

11. The method of claim 8, further comprising:
receiving, at the storage node, a request to commit another transaction to the hierarchical data structure that includes a second transaction state generated by the other one of the storage nodes based on another one or more prior operations performed by the other one storage node;
requesting, by the storage node, the conflict validation for the other transaction including the other one or more prior operations from the transaction log store; and
responsive to determining that the transaction conflicts based on the conflict validation received from transaction log store for the other transaction, returning, by the storage node, a response to indicate that the other transaction failed to commit.

12. The method of claim 8, wherein the transaction state is a transaction state token that includes a transaction sequence number of the hierarchical data structure at a time the transaction was begun at the other storage node.

13. The method of claim 8, wherein the storage node and the other storage node are selected according to a load balancing scheme.

14. The method of claim 8, wherein the distributed data store is a network-based directory service, wherein the client is a client of the network-based directory service, wherein the storage nodes are multi-tenant storing one or more other hierarchical data structures maintained on behalf of one or more other clients of the network-based directory service, and wherein an identified version of the hierarchical data structure is maintained in the memory of the storage node.

15. One or more non-transitory, computer-readable storage media, storing program instructions that when executed on or across one or more computing devices cause the one or more computing devices to implement:
receiving, from a client of a distributed data store, a request to commit a transaction to a hierarchical data structure at a storage node of a plurality of storage nodes of a distributed data store, wherein the request includes:
a transaction state sent to the client by another one of the storage nodes, wherein the transaction state was generated by the other one of the storage nodes, based on one or more prior operations performed by the other one storage node responsive to an earlier request sent from the client to the other one storage node to perform the one or more prior operations; and
one or more additional operations to perform as part of the transaction begun by the earlier request to the other one storage node;
requesting, by the storage node, a conflict validation for the transaction including the one or more prior operations and the one or more additional operations from a transaction log for the hierarchical data structure; and
responsive to determining that the transaction does not conflict based on the conflict validation received from transaction log store, returning, by the storage node, a response to the request acknowledging that the transaction has been committed to the hierarchical data structure.

16. The one or more non-transitory, computer-readable storage media of claim 15, wherein the one or more non-transitory, computer-readable storage media store further program instructions that when executed on or across the one or more computing devices cause the one or more computing devices to further implement performing, by the storage node, the one or more additional operations on a version of the hierarchical data structure stored at the storage node to implement sending an acknowledgment of the access request.

17. The one or more non-transitory, computer-readable storage media of claim 15, storing further instructions that when executed on or across the one or more computing devices cause the one or more computing devices to further implement:
receiving, at the storage node, a request to begin a second transaction including one or more further operations on the hierarchical data structure;
performing, by the storage node, the one or more further operations on the hierarchical data structure; and
returning, by the storage node, a response to the request indicating a state of the second transaction as a transaction state token.

18. The one or more non-transitory, computer-readable storage media of claim 15, storing further instructions that when executed on or across the one or more computing devices cause the one or more computing devices to further implement:
receiving, at the storage node, a request to commit another transaction to the hierarchical data structure that includes a second transaction state generated by the other one of the storage nodes based on another one or more prior operations performed by the other one storage node;
requesting, by the storage node, the conflict validation for the other transaction including the other one or more prior operations from the transaction log store; and
responsive to determining that the transaction conflicts based on the conflict validation received from transaction log store for the other transaction, returning, by the storage node, a response to indicate that the other transaction failed to commit.

19. The one or more non-transitory, computer-readable storage media of claim 15, wherein the storage node and the other storage node are selected according to a load balancing scheme.

20. The one or more non-transitory, computer-readable storage media of claim 15, wherein the distributed data store is a network-based directory service, wherein the client is a client of the network-based directory service, wherein the storage nodes are multi-tenant storing one or more other hierarchical data structures maintained on behalf of one or more other clients of the network-based directory service, and wherein an identified version of hierarchical data structure is maintained in the memory of the storage node.

* * * * *